(12) United States Patent
Umemoto et al.

(10) Patent No.: US 7,030,945 B2
(45) Date of Patent: Apr. 18, 2006

(54) LIQUID-CRYSTAL DISPLAY DEVICE

(75) Inventors: Seiji Umemoto, Ibaraki (JP); Ryoji Kinoshita, Ibaraki (JP); Yuuki Nakano, Ibaraki (JP); Ichiro Amino, Ibaraki (JP); Toshihiko Ariyoshi, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 324 days.

(21) Appl. No.: 10/225,532

(22) Filed: Aug. 22, 2002

(65) Prior Publication Data

US 2003/0043315 A1 Mar. 6, 2003

(30) Foreign Application Priority Data

Aug. 22, 2001 (JP) .......................... 2001-251282
Aug. 22, 2001 (JP) .......................... 2001-251283
Aug. 22, 2001 (JP) .......................... 2001-251284

(51) Int. Cl.
*G02F 1/13* (2006.01)

(52) U.S. Cl. ......................... 349/65; 349/114
(58) Field of Classification Search .............. 349/65, 349/114, 137
See application file for complete search history.

(56) References Cited

U.S. PATENT DOCUMENTS

| | | | |
|---|---|---|---|
| 6,048,071 A | 4/2000 | Sawayama | |
| 6,067,143 A | 5/2000 | Tomita | |
| 6,144,424 A * | 11/2000 | Okuda et al. | 349/65 |
| 6,243,068 B1 | 6/2001 | Evanicky et al. | |
| 6,285,420 B1 * | 9/2001 | Mizumo et al. | 349/65 |
| 6,295,104 B1 | 9/2001 | Egawa et al. | |
| 6,340,999 B1 | 1/2002 | Masuda et al. | |
| 6,456,279 B1 | 9/2002 | Kubo et al. | |
| 6,456,344 B1 | 9/2002 | Nemoto et al. | |
| 6,590,625 B1 * | 7/2003 | Umemoto et al. | 349/65 |
| 6,765,638 B1 * | 7/2004 | Masuzawa | 349/114 |
| 6,768,529 B1 * | 7/2004 | Umemoto et al. | 349/114 |

(Continued)

FOREIGN PATENT DOCUMENTS

| | | |
|---|---|---|
| EP | 0 556 606 A1 | 8/1993 |
| EP | 2 336 933 A | 11/1999 |
| JP | 5-158033 | 6/1993 |
| JP | 11-250715 | 9/1999 |
| JP | 11-236903 | 11/1999 |
| JP | 2000-147499 | 5/2000 |
| JP | 2001-174815 | 6/2001 |
| JP | 2001-183664 | 7/2001 |
| JP | 2001-194517 | 7/2001 |
| JP | 2001-194529 | 7/2001 |
| WO | 99/06881 | 2/1999 |

OTHER PUBLICATIONS

C.Y. Tai, et al.; "Transparent Frontlighting System for Reflective-Type Displays" SID International Symposium Digest of Technical Papers, US, Santa Ana, SID, vol. 26, May 23, 1995; pp. 375–378.

*Primary Examiner*—Kenneth Parker
(74) *Attorney, Agent, or Firm*—Sughrue Mion, PLLC

(57) ABSTRACT

In a liquid-crystal display device, an optical path control layer is provided at least on an outer side of the back side substrate, and has a plurality of optical path changing slopes inclined at an inclination angle of from 35 to 48 degrees with respect to a reference plane of the back side substrate. The optical path control layer has a refractive index higher than that of a low-refractive-index transparent layer provided in the back side substrate. Another low-refractive-index transparent layer lower in refractive index than the transparent substrate may be provided in a visual side substrate. Light sources may be disposed on at least two side surfaces of the liquid-crystal display panel. Light sources may be disposed on side surfaces of the back side substrate and the visual side substrate and at least on side surfaces of the liquid-crystal display panel which are different from each other. Another optical path control layer may be provided also on an outer side of the visual side substrate.

38 Claims, 7 Drawing Sheets

U.S. PATENT DOCUMENTS

| | | |
|---|---|---|
| 6,850,293 B1 * | 2/2005 | Utsumi et al. .............. 349/104 |
| 2001/0004275 A1 | 6/2001 | Umemoto et al. |
| 2001/0007489 A1 | 7/2001 | Umemoto et al. |
| 2001/0009474 A1 | 7/2001 | Umemoto et al. |
| 2001/0053029 A1 | 12/2001 | Umemoto et al. |
| 2002/0033906 A1 * | 3/2002 | Hiroki et al. ................. 349/43 |
| 2002/0039155 A1 * | 4/2002 | Umemoto .................... 349/61 |
| 2002/0140886 A1 | 10/2002 | Sugiura et al. |

* cited by examiner

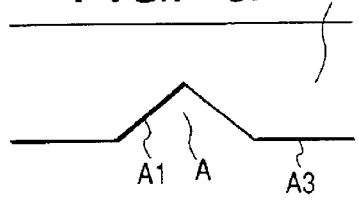
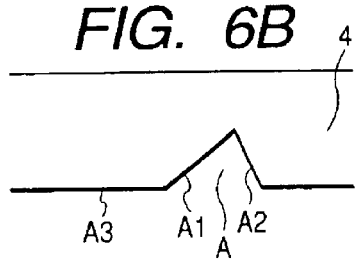
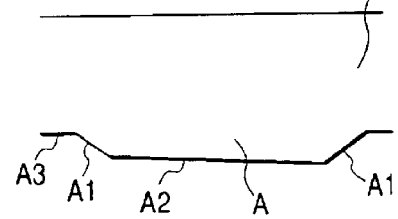
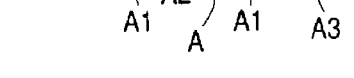
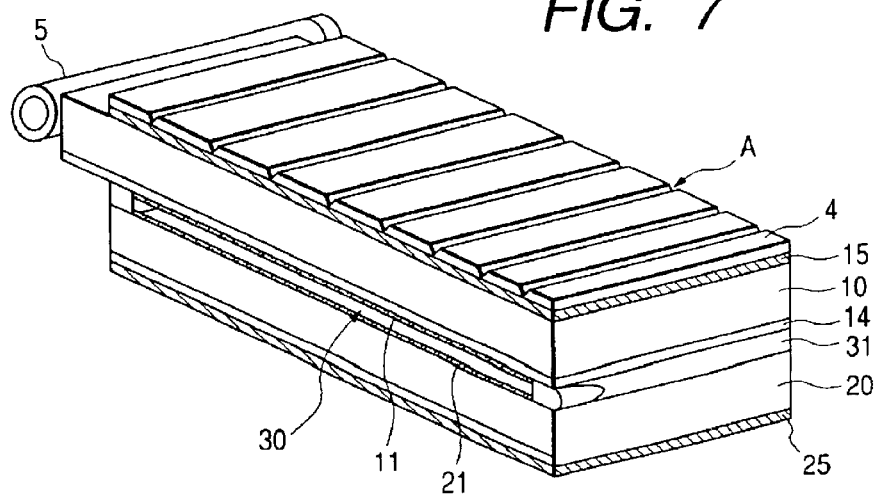

LIQUID-CRYSTAL DISPLAY DEVICE

The present application is based on Japanese Patent Applications Nos. 2001-251282, 2001-251283 and 2001-251284, which are incorporated herein by reference.

BACKGROUND OF THE INVENTION

1. Field of the Invention

The present invention relates to a liquid-crystal display device which is easy to reduce thickness and weight and excellent in display quality and which can be used both in an external light mode and in an illumination mode.

2. Description of the Related Art

A liquid-crystal display device which includes a semi-transmission reflection layer such as a half mirror and which can be used both in an external light mode and in an illumination mode has become popular widely in a portable apparatus such as a portable personal computer or a cellular phone. Reduction in weight achieved by reduction in size and thickness of the portable apparatus has been strongly demanded in order to improve its portability more greatly. There is, however, the actual situation that reduction in thickness and weight of the device as a whole has reached its practical limit because even in the case where a related-art side light type light pipe excellent in thinness is used in a backlight unit to obtain good visibility in an illumination mode, the thickness of the backlight unit is generally not smaller than 2 mm.

In consideration of such circumstances, there has been proposed a reflective liquid-crystal display device which can be used both in an external light mode and in an illumination mode and in which light is made incident on a side surface of a liquid-crystal display panel having a light output means-including optical film provided on a visual side surface of a liquid-crystal cell so that transmitted light in the panel is reflected by the light output means to illuminate the panel (Unexamined Japanese Patent Publication No. 2000-147499). This proposal is made so that a system for illuminating the liquid-crystal display panel can be put into practice by use of the optical film far thinner than the side light type light pipe to thereby achieve reduction in thickness and weight of the device.

There is, however, a problem that display luminance is low because the efficiency of incidence of light on a side surface of the panel is lowered remarkably with the reduction in thickness of cell substrates carried out in the recent years. There is also a problem that it is difficult to make the distribution of luminance uniform when the transmission distance of light in the direction of the side surface is long compared with the thickness of the cell substrates, that is, when the area of the cell substrates is relatively large. These problems arise also in the liquid-crystal display device which includes a semi-transmission reflection layer and which can be used both in an external light mode and in an illumination mode.

SUMMARY OF THE INVENTION

An object of the invention is to develop a semi-transmission reflection layer-including liquid-crystal display device which can be used both in an external light mode and in an illumination mode and in which reduction in thickness and weight regarded as being hardly achieved by a side light type light pipe can be put into practice while the device is excellent in display luminance and its uniformity and good in display quality.

The invention provides a liquid-crystal display device having: a liquid-crystal display panel; a light source disposed on at least one side surface of the liquid-crystal display panel; and an optical path control layer, the liquid-crystal display panel including a liquid-crystal cell, the liquid-crystal cell having a back side substrate, a visual side substrate, and liquid crystal, the back side substrate at least having a transparent substrate, a low-refractive-index transparent layer lower in refractive index than the transparent substrate, and a semi-transmission reflection layer transmitting a part of light while reflecting the other part of light, the visual side substrate at least having a transparent substrate and a transparent electrode, the liquid crystal being held between the back side substrate and the visual side substrate arranged so that electrode sides of the two substrates are opposite to each other with respect to the liquid crystal, the optical path control layer being provided at least on an outer side of the back side substrate, the optical path control layer having a plurality of optical path changing slopes inclined at an inclination angle of from 35 to 48 degrees with respect to a reference plane of the back side substrate, the optical path control layer having a refractive index higher than that of the low-refractive-index transparent layer in the back side substrate.

Another low-refractive-index transparent layer lower in refractive index than the transparent substrate may be provided in the visual side substrate. Light sources may be disposed on at least two side surfaces of the liquid-crystal display panel. In addition, the light sources are disposed on side surfaces of the back side substrate and the visual side substrate and at least on side surfaces of the liquid-crystal display panel which are different from each other. Further, another optical path control layer may be provided also on an outer side of the visual side substrate.

According to the invention, a backlight mechanism can be formed by the light source disposed on side surfaces and the optical path control layer excellent in thinness. While incident light from the light source(s) disposed on the side surface of the panel is transmitted toward the opposite side surface (s) efficiently through the insides of the visual side and back side substrates or the inside of one of visual side and back side substrates, the optical path of the transmitted light is changed efficiently to the visual side of the liquid-crystal display panel by the optical path control layer(s) disposed on the back side or on the visual side and on the back side respectively. Hence, the transmitted light can be utilized for liquid-crystal display in an illumination mode. Liquid-crystal display in an external light mode can be also achieved by the semi-transmission reflection layer. In this manner, there can be obtained a liquid-crystal display device which can be used both in an external light mode and in an illumination mode and which is excellent in reduction in thickness and weight, excellent in brightness and its uniformity and excellent in display quality.

The display device is obtained by use of the low-refractive-index transparent layer(s) provided in the only back side or both of visual side and back side cell substrates respectively, the slope-reflection type optical path control layer(s) and the semi-transmission reflection layer. That is, light incident on side surfaces or one side of the panel can be transmitted toward the opposite side surface(s) efficiently by the confinement effect due to total reflection based on the low-refractive-index transparent layers. Hence, uniformity of brightness in a display screen as a whole is improved, so that good display quality can be achieved. If there is no low-refractive-index transparent layer, display is not easy to view because backward transmission efficiency is so low that the display screen becomes darker as the position on the display screen becomes farther from the light source(s).

On the other hand, light incident on the side surface(s) or transmitted light thereof is reflected by the optical path changing slopes of the optical path control layer(s) so that the optical path of the light can be changed with good directivity by the optical path control layer(s). Hence, reduction in thickness can be achieved. If a method of scatter reflection through a rough surface or the like is used, it is difficult to achieve such directivity. Moreover, because the optical path control layer(s) are used in combination with the liquid-crystal display panel, each of the optical path control layer(s) can be provided as very thin light output means which can be hardly achieved by use of the related-art side light type light pipe. Incidentally, it is possible to form optical path control layer(s) each having a thickness of not larger than 200 µm, particularly not larger than 100 µm.

On the other hand, use of the semi-transmission reflection layer permits balance between its transmittance and its reflectance to be kept to thereby achieve liquid-crystal display excellent in brightness both in an illumination mode and in an external light mode.

Features and advantages of the invention will be evident from the following detailed description of the preferred embodiments described in conjunction with the attached drawings.

BRIEF DESCRIPTION OF THE DRAWINGS

In the accompanying drawings:

FIGS. 6A to 6E are explanatory side views showing light output means in optical path control layer;

FIG. 7 is an explanatory perspective view of a liquid-crystal display device according to another embodiment of the invention;

DETAILED DESCRIPTION OF THE PREFERRED EMBODIMENTS

Figure 1:
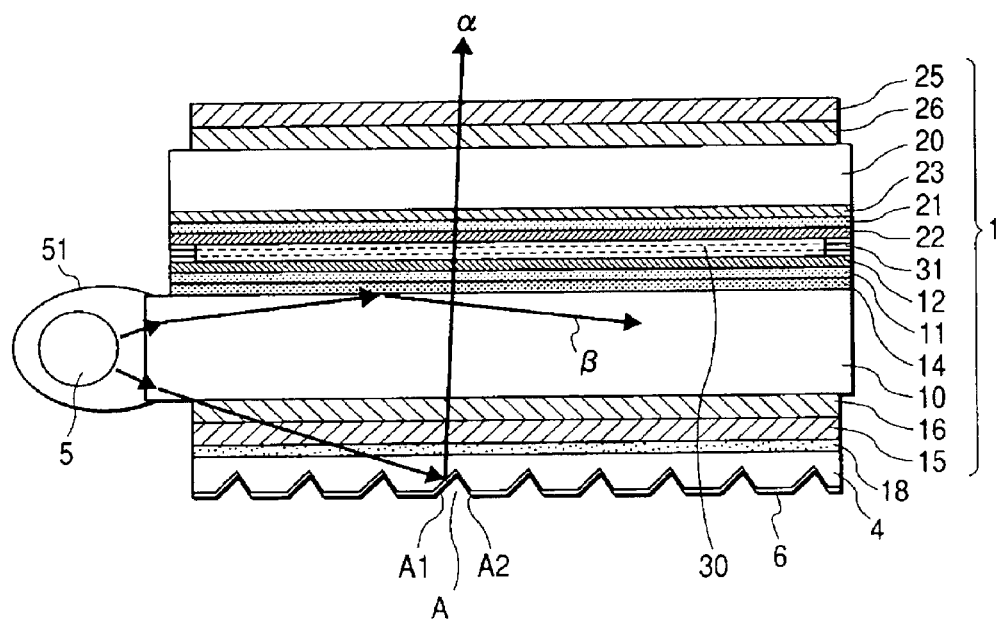
FIG. 1 is an explanatory sectional view of a liquid-crystal display device according to an embodiment of the invention.

A liquid-crystal display device according to the present invention has: a liquid-crystal display panel; a light source disposed on at least one side surface of the liquid-crystal display panel; and an optical path control layer, the liquid-crystal display panel including a liquid-crystal cell, the liquid-crystal cell having a back side substrate, a visual side substrate, and liquid crystal, the back side substrate at least having a transparent substrate, a low-refractive-index transparent layer lower in refractive index than the transparent substrate, and a semi-transmission reflection layer transmitting a part of light while reflecting the other part of light, the visual side substrate at least having a transparent substrate and a transparent electrode, the liquid crystal being held between the back side substrate and the visual side substrate arranged so that electrode sides of the two substrates are opposite to each other with respect to the liquid crystal, the optical path control layer being provided at least on an outer side of the back side substrate, the optical path control layer having a plurality of optical path changing slopes inclined at an inclination angle of from 35 to 48 degrees with respect to a reference plane of the back side substrate, the optical path control layer having a refractive index higher than that of the low-refractive-index transparent layer in the back side substrate.

Hereupon, another low-refractive-index transparent layer lower in refractive index than the transparent substrate may be provided in the visual side substrate. Light sources may be disposed on at least two side surfaces of the liquid-crystal display panel. In addition, the light sources may be disposed on side surfaces of the back side substrate and the visual side substrate and at least on side surfaces of the liquid-crystal display panel which are different from each other. Further, another optical path control layer may be provided also on an outer side of the visual side substrate.

FIGS. 1 to 5 show examples of the liquid-crystal display device. The reference numeral 1 designates a liquid-crystal display panel; 4 and 41, optical path control layers; A1 and B1, optical path changing slopes; 10, a back side transparent substrate; 11 (11b), a semi-transmission reflection layer which may serve also as an electrode; 14, a low-refractive-index transparent layer; 20, a visual side transparent substrate; 21, a transparent electrode; 24, a low-refractive-index transparent layer; 30, liquid crystal; and 5 and 52, light sources. Incidentally, the reference numerals 12 and 22 designate oriented films; 15 and 25, polarizers; 16 and 26, phase retarders; 23, a color filter; and 6, a light reflecting layer.

As shown in the drawings, the liquid-crystal display panel 1 includes a liquid-crystal cell having a back side substrate (10), a visual side substrate (20), and liquid crystal 30. The back side substrate (10) at least has a transparent substrate 10, a low-refractive-index transparent layer 14 lower in refractive index than the transparent substrate, and a semi-transmission reflection layer (electrode) 11 transmitting a part of light while reflecting the other part of the light. The visual side substrate (20) at least has a transparent substrate 20, and a transparent electrode 21, especially, further including a low-refractive-index transparent layer 24 lower in refractive index than the transparent substrate in the devices shown in FIGS. 3 to 5. The liquid crystal 30 is held between the back side substrate (10) and the visual side substrate (20) arranged so that the electrodes 11 and 21 of the two substrates are opposite to each other with respect to the liquid crystal 30. As the liquid-crystal display panel 1, it is possible to use a suitable one that light incident on the back side emerges as display light from the visual side through control of the liquid crystal. The liquid-crystal display panel 1 is not particularly limited in kind. Incidentally, in FIG. 1, the reference numeral 31 designates a sealing material for enclosing the liquid crystal 30 between the transparent substrates 10 and 20.

Specific examples of the liquid-crystal cell on the basis of the aligning format of liquid crystal include: a twisted or non-twisted liquid-crystal cell such as a TN liquid-crystal cell, an STN liquid-crystal cell, a vertically aligned cell, an HAN cell or an OCB cell; a guest-host liquid-crystal cell; a ferroelectric liquid-crystal cell; and a liquid-crystal cell using light diffusing. In addition, as the system for driving the liquid crystal, for example, a suitable drive system such as an active matrix system or a passive matrix system may be used.

A transparent substrate is used as each of the visual side and back side cell substrates in order to allow illumination light or display light to be transmitted through the transparent substrate. The transparent substrate can be made of any suitable material such as glass or resin. Particularly, the transparent substrate may be preferably made of an optically isotropic material from the point of view of suppressing birefringence as much as possible to reduce light loss. Further, a material excellent in colorlessness and transparency, such as a non-alkali glass plate as against a blue glass plate, is preferably used from the point of view of improvement in luminance and display quality. Further, a resin substrate is preferably used from the point of view of reduction in weight.

The low-refractive-index transparent layer provided in the back side substrate or each of the back side and visual side substrates is provided for improving uniformity of brightness on the whole display screen. That is, when the low-refractive-index transparent layer is provided as a layer lower in refractive index than the transparent substrate constituting the back side or visual side substrate, and when incident light from the light source 5 or 52 is transmitted through the back side substrate 10 or the visual side substrate 20 as represented by the broken arrow β in FIG. 1; β1, β2, β3 or β4 in FIGS. 3 and 4; β1 or β2 in FIG. 5, the transmitted light is totally reflected on the basis of the refractive index difference between the back side substrate 10 and the transparent layer 14 or between the visual side substrate 20 and the transparent layer 24 so that the transmitted light can be confined in the back side or visual side substrate efficiently As a result, the transmitted light can be transmitted toward opposite side surfaces (backward) efficiently, so that the transmitted light can be supplied uniformly to the optical path changing slopes A1 and B1 of the optical path control layers 4 and 41 even in positions far from the light sources respectively to thereby improve uniformity of brightness on the whole display screen on the basis of change of the optical path of the light through reflection by the slopes as represented by the broken arrows α in FIG. 1; α1, α2, α3 and α4 in FIGS. 3 and 4; α1 and α2 in FIG. 5.

The low-refractive-index transparent layers are also effective in preventing reduction or unevenness of the transmitted light due to partial variation in the transmission state of the light generated when the transmitted light is made incident on the liquid-crystal layer and subjected to birefringence and scattering. That is, the low-refractive-index transparent layers can prevent display from becoming dark. The low-refractive-index transparent layers are further effective in preventing deterioration of display quality from being caused by back ghosting of the display near the light sources.

When a color filter or the like is disposed, corresponding one of the low-refractive-index transparent layers is further effective in preventing the color filter from absorbing the transmitted light so as to prevent rapid attenuation of the transmitted light and avoid reduction of the transmitted light. If incident light from the light sources is transmitted through the liquid-crystal layer, there is a tendency that the transmitted light is scattered by the liquid-crystal layer to form an uneven transmission state to bring unevenness of emergent light or ghosting to make a display image difficult to view.

Each of the low-refractive-index transparent layers may be made of a suitable material such as an inorganic or organic low-refractive-index dielectric having a refractive index lower than that of the transparent substrate constituting the back side or visual side substrate. Each of the low-refractive-index transparent layers can be formed by a suitable method such as a vacuum vapor deposition method or a spin coating method. The material and method for forming the low-refractive-index transparent layers are not particularly limited. From the point of view of achieving efficiency of backward transmission through total reflection as described above, the refractive index difference between the transparent layer and the transparent substrate is preferably selected to be as large as possible. It is preferable that the refractive index difference is particularly not smaller than 0.05, more particularly in a range of from 0.1 to 0.4.

When the refractive index difference is in the preferred range, the refractive index difference has little influence on display quality in an external light mode. Incidentally, when the refractive index difference is 0.1, external light reflectance in the interface between the transparent layer and the transparent substrate is not larger than 0.1% and lowering in brightness or contrast due to reflection loss is extremely small.

The positions of arrangement of the low-refractive-index transparent layers can be determined suitably. The low-refractive-index transparent layers may be preferably located between the transparent substrate 10 and the semi-transmission reflection layer 11 and between the transparent substrate 20 and the transparent electrode 21 respectively as shown in FIG. 1 in order to attain the transmitted light confinement effect and to prevent the transmitted light from entering the liquid-crystal layer. When a color filter 23 is disposed between the transparent substrate 10 and the semi-transmission reflection layer 11 or between the transparent substrate 20 and the transparent electrode 21, corresponding one of the low-refractive-index transparent layers may be preferably located nearer the transparent substrate 10 or 20 than the color filter in order to prevent absorption loss of the transmitted light from being caused by the color filter. Therefore, the low-refractive-index transparent layers 14 and 24 are generally provided directly on the back side transparent substrate 10 and the visual side transparent substrate 20 respectively.

On this occasion, it is preferable that the surface of the substrate to which the transparent layer is attached is as smooth as possible. That is, it is preferable that the transparent layer is as smooth as possible in order to prevent scattering of the transmitted light favorably and from the point of view of preventing influence on display light. Incidentally, from this point of view, the color filter 23 is generally preferably located on the visual side substrate 20 side as shown in drawings.

The thickness of each of the low-refractive-index transparent layers is preferably selected to be larger in order to retain the total reflection effect. It is because if the thickness is too small, the confinement effect may be reduced due to a wave exuding phenomenon. The thickness can be determined suitably in accordance with the total reflection effect. Generally, the thickness is preferably selected to be not smaller than a quarter wavelength (95 nm), particularly not smaller than a half wavelength (190 nm), more particularly not smaller than a wavelength (380 nm), further particularly not smaller than 600 nm, in terms of optical path length calculated by a product of refractive index and layer thickness, from the point of view of the total reflection effect with respect to visible light in a wavelength range of from 380 to 780 nm, particularly with respect to short-wave light with a wavelength of 380 nm. Particularly when the back side substrate is used as a substrate for transmitting incident light from the light source as described above, it is preferable from the point of view of incidence efficiency and transmission efficiency that the cross-sectional area of the back side substrate is as large as possible, that is, the back side substrate is as thick as possible. On the other hand, it is preferable from the point of view of reduction in thickness and weight that the visual side substrate is as thin as possible.

Hence, the thickness of each of the back side and visual side cell substrates 10 and 20 may be determined suitably in accordance with enclosure strength of liquid crystal without any particular limitation. Generally, from the point of view of balance between incidence or transmission efficiency of incident light from each of the light sources and reduction in thickness and weight of the cell substrate as a transmission substrate, the thickness of the cell substrate is preferably selected to be in a range of from 10 µm to 5 mm, particularly in a range of from 50 µm to 2 mm, more particularly in a range of from 100 µm to 1 mm.

The thickness of the back side transparent substrate and the thickness of the visual side transparent substrate may be equal to or different from each other. Incidentally, each of the transparent substrates may be a plate having a uniform thickness or may be a plate having partially uneven thicknesses like a wedge shape in cross section especially in the back side substrate in order to improve the efficiency of incidence of the transmitted light on the optical path changing slopes of the optical path control layer arranged obliquely.

Figure 2:
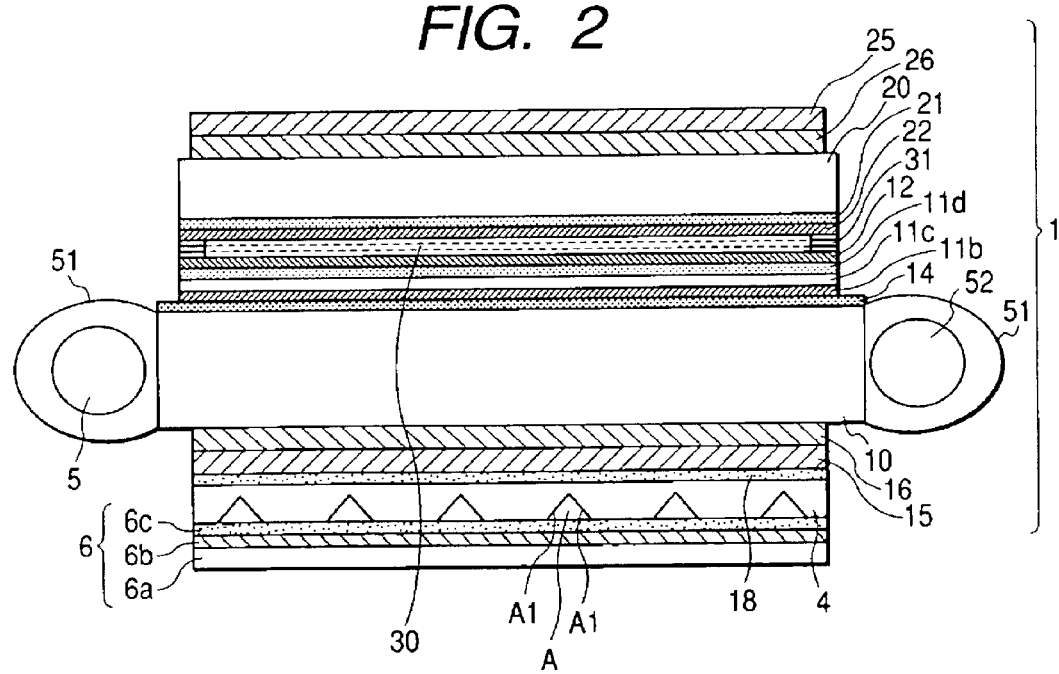
FIG. 2 is an explanatory sectional view of a liquid-crystal display device according to another embodiment of the invention.

The back side transparent substrate and the visual side transparent substrate may be equal in planar size to each other or may be different in planar size from each other. From the point of view of using the back side and visual side substrates as substrates for transmitting incident light from the light sources, each of side surfaces on which the light sources 5 and 52 are disposed respectively is preferably provided protrusively as shown in FIGS. 1, 2 and 5, that is, a side surface formed by the visual side substrate 20 (or the back side substrate 10) preferably protrudes more outward than a corresponding side surface formed by the back side substrate 10 (or the visual side substrate 20) in order to improve the efficiency of incidence in the case where the light source is disposed on the protruded side surface. In contrast, from the point of view of disposing the light source over both back side and visual side substrates in balance, the side surfaces of back side and visual side substrates are preferably flush at least on the side where the light source is disposed as shown in FIGS. 3 and 4.

Figure 3:
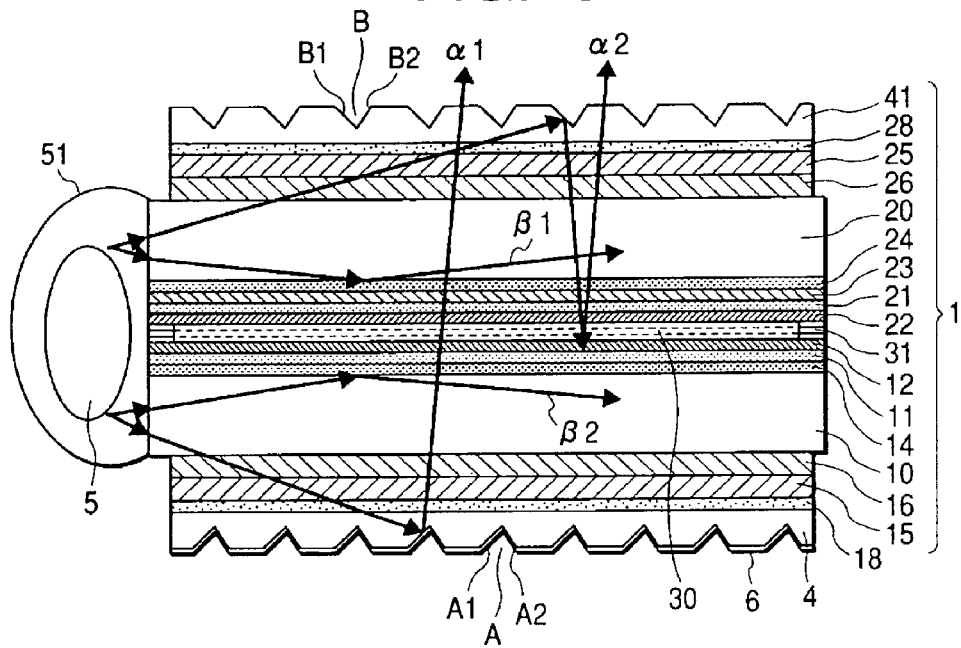
FIG. 3 is an explanatory sectional view of a liquid-crystal display device according to still another embodiment of the invention.
Figure 4:
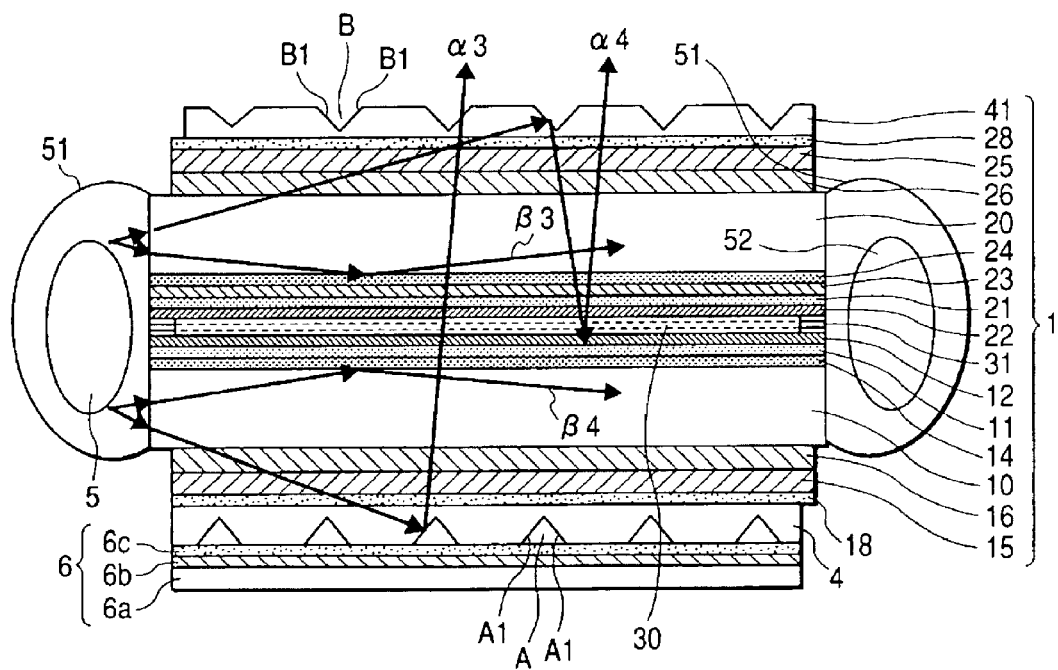
FIG. 4 is an explanatory sectional view of a liquid-crystal display device according to still embodiment of the invention.
Figure 5:
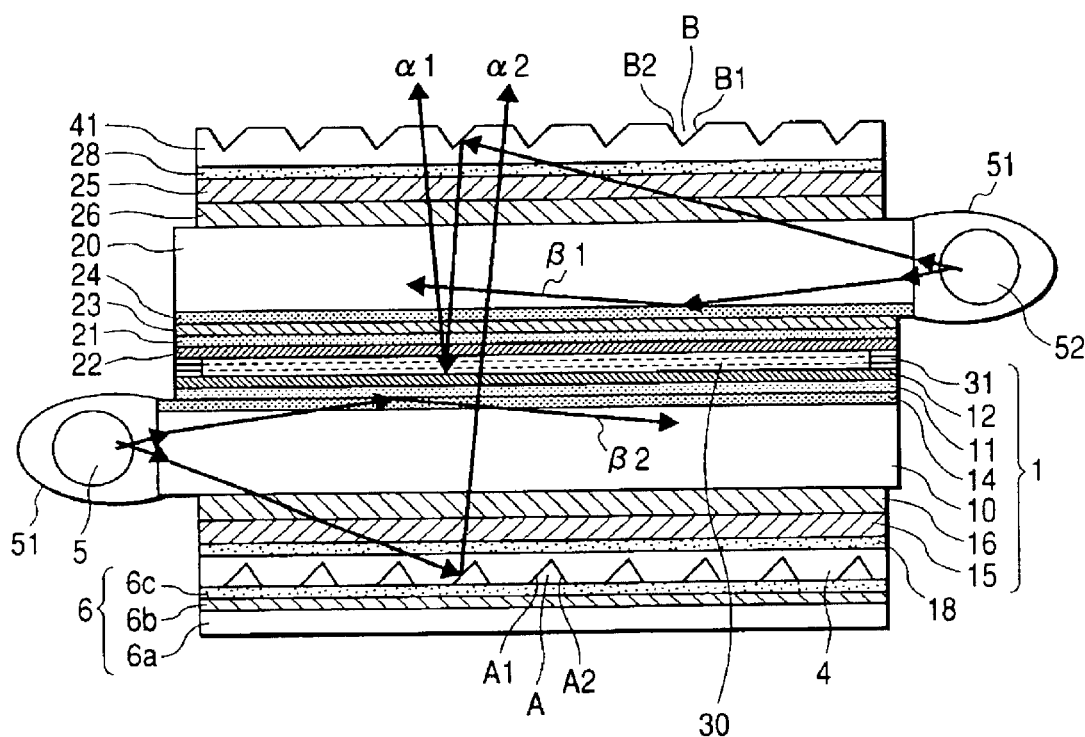
FIG. 5 is an explanatory sectional view of a liquid-crystal display device according to still another embodiment of the invention.

As shown in drawings, the semi-transmission reflection layer provided in the back side transparent substrate transmits back light ($\alpha 1$ and $\alpha 3$ in FIGS. 3 and 4; $\alpha 2$ in FIG. 5) given from the back side and reflects front light ($\alpha 2$ and $\alpha 4$ in FIGS. 3 and 4; $\alpha 1$ in FIG. 5) given from the visual side in an illumination mode, but reflects incident external light in an external light mode. Hence, there can be achieved a liquid-crystal display device which can be used both in an external light mode and in an illumination mode.

The semi-transmission reflection layer can be formed as a suitable layer transmitting a part of light while reflecting the other part of light, such as a half mirror or a reflecting layer having openings. Particularly, a metal thin film such as a half mirror or a metal layer having openings may be preferably used in order to retain the function in the liquid-crystal cell.

The ratio of light transmittance of the semi-transmission reflection layer to light reflectance thereof can be determined suitably in accordance with balance between brightness in an illumination mode and brightness in an external light mode. Generally, the light transmittance of the semi-transmission reflection layer is selected to be in a range of from 5 to 95%, particularly in a range of from 15 to 85%, more particularly in a range of from 25 to 75%. Incidentally, the thickness of the half mirror can be controlled in the half mirror method or the percentage occupied by the openings can be controlled in the opening method to change the ratio of light transmittance to light reflectance.

Incidentally, in the case where the semi-transmission reflection layer is formed by the opening method, openings with a size in a range of from 5 to 95%, particularly in a range of from 15 to 85%, more particularly in a range of from 25 to 75% as large as the size of pixels in the liquid-crystal cell are preferably distributed in accordance with the arrangement of the pixels as much as possible in order to improve uniformity of brightness on the display screen. The semi-transmission reflection layer having such openings can be formed by a suitable method such as a method of perforating a reflecting plate, a method of etching a reflecting layer, or a method of vapor-depositing a reflecting material through a mask having predetermined openings.

The semi-transmission reflection layer may be preferably formed to have a rough surface for scatter-reflecting incident external light in order to improve the efficiency of utilizing external light and uniformity of brightness in an external light mode. In the case where the semi-transmission reflection layer is made of a thick film such as a film of metal foil, for example, a surface of the thick film may be treated by a surface roughening method such as a buffing treatment so as to be formed as a roughness type light scattering surface.

On the other hand, in the case where the semi-transmission reflection layer is made of a thin film by a vapor deposition method, for example, the semi-transmission reflection layer capable of scatter-reflecting incident external light can be formed by a method of forming a thin film having a rough surface as reflection of a roughness type light scattering surface formed as a surface of the transparent substrate. On this occasion, from the point of view of retaining the smoothness of the low-refractive-index transparent layer, it is preferable that a layer of a surface roughness structure is provided on a surface-smooth low-refractive-index transparent layer provided by use of a surface-smooth transparent substrate.

In the latter method, front and rear surfaces of the semi-transmission reflection layer can be formed as scatter-reflecting surfaces. Hence, there is an advantage in that display quality can be improved. That is, when light transmitted through the substrate reaches the semi-transmission reflection layer in an illumination mode after the optical path of the light is changed, the light is scatter-reflected by the front and rear surfaces of the semi-transmission reflection layer so that the transmission distance of the light is shortened. Moreover, a large part of light transmitted through the semi-transmission reflection layer is prevented from emerging because the large part of the light is confined in the substrate opposite to the visual side or back side substrate or because of the influence of absorption and phase difference generation caused by the liquid-crystal layer, the color filter layer, etc.

As a result, there can be suppressed rapid reduction of the transmitted light caused by absorption of light to the semi-transmission reflection layer and the drive circuit. Moreover, there can be suppressed display darkening which is generated because of reduction or unevenness of the transmitted light due to birefringence of the liquid-crystal layer based on transmission through the semi-transmission reflection layer or due to partial change based on light scattering. Moreover, there can be suppressed occurrence of a ghost phenomenon in which display in a portion near the light source side has influence on the rear. The opening type semi-transmission reflection layer has the same advantage.

The semi-transmission reflection layer may be provided to serve also as an electrode for forming a liquid-crystal drive circuit. Example thereof are shown in FIGS. 1, 3, 4 and 5. Alternatively, a transparent electrode for forming a liquid-crystal drive circuit may be provided separately from the semi-transmission reflection layer. An example thereof is shown in FIG. 2. Particularly FIG. 2 shows the case where the transparent substrate 10 having a roughness type light scattering surface is used. In this case, it is preferable that the transparent electrode is not roughened.

For example, the prevention of roughening of the transparent electrode can be performed by a method in which a surface-smooth transparent electrically insulating layer for 11c leveling is provided on the semi-transmission reflection layer 11b having a roughness type light scattering surface so that the transparent electrode 11d can be formed on the transparent electrically insulating layer. For example, the transparent electrically insulating layer can be formed by a suitable method such as a method of forming a coating layer of a transparent resin. The liquid-crystal display device may be formed to have a liquid-crystal drive circuit provided between the low-refractive-index transparent layer and the semi-transmission reflection layer in the back side substrate.

The transparent electrode provided in the visual side transparent substrate and the transparent electrode provided in the back side transparent substrate as occasion demands can be made from any suitable material described in the related art, such as ITO. For the formation of the liquid-crystal cell, at least one suitable functional layer such as an oriented film constituted by a film subjected to a rubbing treatment for orienting liquid crystal or a color filter for color display may be provided as occasion demands.

Incidentally, as shown in drawings, the oriented films 12 and 22 are generally formed on the electrodes 11 (11d) and 21 respectively so as to be particularly in contact with the liquid crystal. The color filter 23 is generally provided between the transparent substrate as one of the cell substrates 10 and 20 and the corresponding electrode. Incidentally, the color filter 23 is provided on the visual side substrate 20 side in the drawings.

As shown in FIGS. 1 to 5, in the liquid-crystal display panel, the crystal cell may be additionally provided with one or two or more suitable optical layers such as polarizers 15 and 25, phase retarders 16 and 26 and a light-diffusing layer as occasion demands. The polarizers are provided for achieving display using linearly polarized light. The phase retarders are provided for compensating for the phase difference caused by birefringence of liquid crystal to thereby improve display quality.

The light-diffusing layer is provided for enlarging the display range by diffusing display light, for achieving uniformity of luminance by leveling bright-line-like emission through the optical path changing slopes of the optical path control layer, and for increasing the quantity of light incident on the optical path control layer by diffusing light transmitted through the liquid-crystal display panel. Therefore, at least one light-diffusing layer can be provided in a suitable position between the back side optical path control layer 4 and the visual side polarizer 25.

As each of the polarizers, it is possible to use a suitable one without any specific limitation. From the point of view to obtain display with a good contrast ratio by use of the incidence of highly linearly polarized light, a polarizer with a high degree of polarization can be used preferably. Examples of the material of the polarizer include: an absorption type polarizing film formed in such a manner that a hydrophilic high-molecular film such as a polyvinyl alcohol-based film, a partially formalized polyvinyl alcohol-based film or a partially saponified ethylene-vinyl acetate copolymer film is stretched after iodine or a dichromatic substance such as dichromatic dye is adsorbed to the hydrophilic high-molecular film; and an absorption type polarizing film defined above and having one transparent protective layer provided on one or each of opposite sides of the absorption type polarizing film.

The formation of the transparent protective layer is preferably performed by use of a material excellent in transparency, mechanical strength, thermal stability and moisture sealability. Examples of the material include: polymer such as acetate-based resin, polyester-based resin, polyether-sulfone-based resin, polycarbonate-based resin, polyamide-based resin, polyimide-based resin, polyolefin-based resin, acrylic-based resin, polyether-based resin, polyvinyl chloride resin, styrene-based resin or norbornene-based resin; and heat-curable or ultraviolet-curable resin such as acrylic-based resin, urethane-based resin, acrylic-urethane-based resin, epoxy-based resin or silicone-based resin.

The transparent protective layer may be attached by a method such as a bonding method using the form of a film or a coating method using the form of a polymer solution. Hence, the technique used for forming the transparent protective layer can be also used for forming the transparent electrically insulating layer.

The polarizers used, particularly the visual side polarizer, may be subjected to a non-glare treatment or an anti-reflection treatment for preventing viewing from being disturbed by surface reflection of external light. The non-glare treatment can be performed to form a surface of the polarizer as a fine roughness structure. Various methods may be used for the non-glare treatment. Examples of the methods include: a surface roughening method such as a sandblasting method or an embossing method; a method of mixing transparent particles such as silica particles; and a method of applying a resin containing transparent particles. The anti-reflection treatment can be made by a method of forming an interference deposited film.

Alternatively, the non-glare treatment or anti-reflection treatment can be made by a method of bonding a film having a surface fine roughness structure or an interference film. Incidentally, two polarizers may be provided on opposite surfaces of the liquid-crystal cell respectively as shown in the FIGS. 1 and 2, or one polarizer may be provided on only one surface of the liquid-crystal cell. The technique for forming the surface fine roughness structure can be applied to the case where surfaces of the half-transmission reflecting layer or/and the transparent substrate are provided as roughness type light scattering surfaces.

On the other hand, as each of the phase retarders, it is possible to use a suitable material such as a birefringent film obtained in such a manner that a film formed from a suitable polymer, for example, as listed in the description of the transparent protective layer is stretched by a suitable method such as a uniaxal or biaxial stretching method, an oriented film of a suitable liquid-crystal polymer such as a nematic or discotic liquid-crystal polymer, or an oriented film having an oriented layer supported by a transparent base material. The refractive index of the phase retarder in the direction of the thickness thereof may be controlled under the action of heat-shrinking force of a heat-shrinkable film.

As shown in the drawings, the compensating phase retarders 16 and 26 are generally disposed between the visual side and back side polarizers 15 and 25 and the liquid-crystal cell in accordance with the necessity. As each of the phase retarders, it is possible to use a suitable one in accordance with the wavelength range. In addition, each of the phase retarders may be used in the form of two or more layers superposed on each other in order to control optical characteristic such as a phase difference.

The light-diffusing layer can be provided by a suitable method using a coating layer, a diffusing sheet, or the like, having a surface fine roughness structure. The light-diffusing layer may be formed as a pressure sensitive adhesive layer containing transparent particles so that the light-diffusing layer can serve also as a layer for bonding a polarizer or a phase retarder to thereby attain reduction in thickness. For forming the pressure sensitive adhesive layer, there can be used a tackifier containing, as a base polymer, a suitable polymer such as a rubber-based polymer, an acrylic-based polymer, a vinyl-alkyl ether-based polymer, a silicone-based polymer, a polyester-based polymer, a polyurethane-based polymer, a polyether-based polymer, a polyamide-based polymer or a styrene-based polymer.

Particularly, there can be preferably used a tackifier excellent in transparency, weather resistance and heat resistance, such as an acrylic-based tackifier containing, as a base polymer, a polymer mainly composed of acrylic or methacrylic alkyl ester. As the transparent particles which may be contained in the pressure sensitive adhesive layer, one kind or two kinds of suitable transparent particles may be selected from inorganic particles and organic particles. The inorganic particles maybe electrically conductive and are made of silica, alumina, titania, zirconia, tinoxide, indiumoxide, cadmium oxide, anti monyoxide, or the like, with a means particle size ranging from 0.5 µm to 20 µm. The organic particles are made of a crosslinked or non-crosslinked polymer, or the like. The transparent particles may be used for the aforementioned non-glare treatment.

The light sources disposed on side surfaces of the liquid-crystal display panel are provided so that light used for illuminating the liquid-crystal display device is made incident on the side surfaces of the liquid-crystal display panel. Thus, reduction in thickness and weight of the liquid-crystal display device can be attained when the light sources are used in combination with the optical path control layers disposed on a back-surface side or opposite surface sides of the panel. As each of the light sources, it is possible to use a suitable one. Examples of the light source include: a linear light source such as a (cold or hot) cathode tube; a point light source such as a light-emitting diode; an array in which such point light sources are set in a linear or planar array; and a combination of a point light source and a linear light pipe through which incident light from the point light source is converted into light for forming a linear light source through the linear light pipe. In the example shown in FIGS. 1 and 2, from the point of view of preventing the incident light emitted the light source from entering the liquid crystal layer, the light source(s) is/are disposed on the side surface (s) of the back side substrate, especially, being protruded more outward than the side surface of visual side substrate. The light source is disposed on at least one side surface of the liquid crystal display panel.

As shown in FIG. 5, the light sources 5 and 52 may be disposed on at least two different side surfaces of the liquid-crystal display panel and on the visual side and back side substrates respectively. The plurality of side surfaces may be constituted by a combination of opposite side surfaces as shown in FIGS. 2, 4 and 5, by a combination of side surfaces intersecting crosswise both vertically and horizontally or by a combination of three or more side surfaces in use of both the combinations. Such a method of arranging the light sources on different side surfaces can prevent the positions of the light sources from interfering with each other mechanically. Moreover, when the light sources are provided so that they can be switched on/off independently of each other, the switching-on/off of the respective light sources can be controlled to change brightness stepwise. Incidentally, the light sources may be disposed on a plurality of side surfaces of one and the same substrate as shown in FIG. 2.

In the method in which the light sources are disposed on opposite side surfaces as shown in FIG. 5, there is more advantageous in terms of improvement in luminance and improvement in uniformity of luminance on the whole screen because the angular characteristics of emergent light rays are complementary to each other while the phenomena of brightness on opposite end sides far from the light sources are complementary to each other. Moreover, in this case, when a side surface of one substrate on which a light source is disposed is formed to protrude more outward than a corresponding side surface of the other substrate as shown in FIG. 5, the workability in disposing the light source and the workability in surrounding and holding the light source by a light source holder can be improved while entrance of incident light from the light source into the liquid-crystal layer can be suppressed.

Switching-on of the light sources allows visibility in an illumination mode. Because it is unnecessary to switch on the light sources when visibility is made by external light in an external light mode, the light sources of the display device which can be operated both in the external light mode and in an illumination mode are set to be changeable between switching on and switching off. As the change-over method, it is possible to use any desirable one. Any related-art method may be used as the change-over method. Incidentally, each of the light sources may be of a multi-color emission type that can switch its own emission color. Alternatively, different colors of light may be emitted through different kinds of light sources.

In accordance with necessity, as shown in drawings, each of the light source 5 and 52 may be formed in a combined body provided with a suitable assisting unit such as a light source holder 51 for surrounding the light source to guide divergent light to a side surface of the liquid-crystal display panel. As the light source holder, a suitable reflecting sheet which reflects at least light from the light source may be used. As the reflection sheet, it is possible to use a resin sheet provided with a high reflectance metal thin film, a white sheet, a metal foil sheet, a resin molded piece, or the like.

The light source holder may be used as a retaining unit also having a function of surrounding the light source. On this occasion, the light source holder can surround and retain the light source in such a manner that end portions of the light source holder are bonded to end portions of upper and lower surfaces of the back side or visual side substrate. Incidentally, in the case where one light source is disposed on both back side and visual side substrates as shown in FIGS. 3 and 4, there may be used a method in which the light source holder surrounds and retains the light source in such a manner that bonding is laid from an end portion of an upper surface of the visual side substrate to an end portion of a lower surface of the back side substrate through end portions of the light source holder.

The optical path control layer 4 disposed on the back side is provided for the following purpose. That is, the optical path of incident light from the light source 5, 52 disposed on a side surface of the liquid-crystal display panel 1, or the optical path of transmitted light of the incident light is changed toward the visual side of the panel through the optical path changing slopes A1 as represented by the arrow α in FIG. 1; α3 and α4 in FIGS. 3 and 4; α2 in FIG. 5 so that the purpose of utilizing the light as illumination light (display light) is achieved. The optical path control layer 4 is disposed on the outside of the back side substrate 10 of the liquid-crystal display panel 1.

On the other hand, the optical path control layer 41 disposed on the visual side shown in FIGS. 3 to 5 is provided for the following purpose. That is, after the optical path of incident light from the light source 52 disposed on a side surface of the liquid-crystal display panel 1, or the optical path of transmitted light of the incident light is changed toward the back side of the panel through the optical path changing slopes B1, the light is reflected by the semi-transmission reflection layer 11 to travel inversely as represented by the arrow α2, α4 in FIGS. 3 and 4; α1 in FIG. 5 so that the purpose of utilizing the light as illumination light (display light) is achieved. The optical path control layer 41 is disposed on the outside of the visual side substrate 20 of the liquid-crystal display panel 1.

In order to achieve the purpose, the optical path control layer 4 or 41 is provided with optical path changing slopes A1 or B1 each inclined at an inclination angle in a range of from 35 to 48 degrees with respect to a reference plane (virtual horizontal plane) of the back side or visual side substrate so that the incident light from the light source 5 or 52 is reflected to thereby change the optical path of the light into a predetermined direction as shown in FIGS. 1 to 5.

Each of the optical path control layers has a plurality of such optical path changing slopes for the purpose of attaining reduction in thickness. Each of the optical path control layers is formed as a layer having a refractive index higher than that of the nearest low-refractive-index transparent layer provided on the back side or visual side substrate. If the refractive index of the optical path control layer is lower than that of the transparent layer, incident light from the light source or transmitted light of the incident light is apt to be confined in the back side or visual side substrate. As a result, incidence of light onto the optical path control layer is disturbed so that the light can hardly be utilized as display light.

Each of the optical path control layers can be formed as a layer having any suitable form except that the optical path control layer has a plurality of such predetermined optical path changing slopes. From the point of view of changing the optical path of the light to obtain display light excellent in frontal directivity, the optical path control layers are preferably provided as optical path control layers 4 and 41 having light output means A and B with optical path changing slopes A1 and B1 facing the side surfaces where the light sources are disposed, that is, facing the incidence side surfaces, and more preferably provided as optical path control layers having light output means A and B with optical path changing slopes A1 and B1 made of prism-like roughnesses.

FIGS. 6A to 6E show examples of the light output means with optical path changing slopes or prism-like roughnesses described above. In FIGS. 6A to 6C, each of the light output means A is shaped like a triangle in cross section. In FIGS. 6D and 6E, it is shaped like a quadrangle in cross section. In addition, in FIG. 6A, each of the light output means A has two optical path changing slopes A1 constituted by two equal sides of an isosceles triangle. In FIG. 6B, each of the light output means A has an optical path changing slope A1, and a steep slope A2 having a larger inclination angle than that of the slope A1 with respect to the reference plane.

In FIG. 6C, each of the light output means A has an optical path changing slope A1, and a gentle slope A2 having a smaller inclination angle than that of the slope A1 with respect to the reference plane. Further, in FIG. 6C, the light output means A are formed on the whole of one side surface of the optical path control layer so as to be continuously adjacent to one another. In FIG. 6D, the light output means A are constituted by convex portions (protrusions). In FIG. 6E, the light output means A are constituted by concave portions (grooves). Although combinations of optical path changing slopes A1 and steep or gentle slopes A2 in the light output means A are shown in FIGS. 6A to 6E, combinations of optical path changing slopes B1 and steep or gentle slopes B2 in the light output means B may be formed in the same manner as in the light output means A (this rule applies hereunder).

As the examples described above, therefore, the light output means may be constituted by convex or concave portions each made of equilateral sides or slopes with equal inclination angles, or may be constituted by convex or concave portions each made of a combination of an optical path changing slope and a steep or gentle slope or slopes different in inclination angle. The format of the slopes may be determined suitably in accordance with the number and positions of side surfaces on which light is made incident. From the point of view to improve mar-proofness to retain the function of the slopes, it is favorable to form the light output means into concave portions rather than convex portions because the slopes, or the like, in the concave portions are hardly damaged.

From the point of view to attain the characteristic such as frontal directivity, it is preferable that each of the optical path control layers has the optical path changing slopes A1 or B1 each of which has an inclination angle in a range of from 35 to 48 degrees with respect to the reference plane and which face the side surface where light is incident, as shown in FIGS. 6A to 6E. Therefore, when light sources are disposed on two or more side surfaces of the liquid crystal display panel or one and the same substrate so that two or more incidence side surfaces are provided, it is preferable to use optical path control layers having optical path changing slopes A1 and B1 formed in accordance with the number and positions of the incidence side surfaces.

Incidentally, in the case where light sources are disposed on two opposite side surfaces of the liquid crystal display panel or one and the same substrate, it is preferable to use optical path control layers 4 and 41 having light output means A and B each having two optical path changing slopes A1 or B1 provided in the following manner. That is, as shown in FIG. 6A, the ridgelines of the two optical path changing slopes A1 or B1 of each light output means A or B shaped like an isosceles triangle in cross section go parallel with the incidence side surfaces. Alternatively, as shown in FIGS. 6D and 6E, the ridgelines of the two optical path changing slopes A1 or B1 of each light output means A or B shaped like a trapezoid in cross section go parallel with the incidence side surfaces.

In the case where light sources are disposed on two side surfaces of the liquid-crystal display panel so that the two side surfaces are perpendicularly adjacent to each other, it is preferable to use optical path control layers having optical path changing slopes A1 or B1 provided in such a manner that the ridgelines of the optical path changing slopes go parallel with the two side surfaces perpendicularly adjacent to each other. In the case where light sources are disposed on three or more side surfaces including side surfaces opposite to each other and side surfaces perpendicularly adjacent to each other, it is preferable to use optical path control layers having optical path changing slopes A1 or B1 constituted by these combinations.

The optical path changing slopes A1 or B1 play the following role. That is, among light incident on side surfaces from the light sources and transmitted light thereof, light incident on the slopes A1 or B1 is reflected by the slopes A1 or B1 to change the optical path of the light to the viewing direction of the liquid-crystal display panel to thereby supply the light as light capable of being utilized for panel display. In this case, the inclination angle of the optical path changing slopes A1 or B1 with respect to the reference plane is selected to be in a range of from 35 to 48 degrees. Thus, as represented by the broken arrow $\alpha$ in FIG. 1; $\alpha 1$, $\alpha 2$, $\alpha 3$ and $\alpha 4$ in FIG. 3 or 4; $\alpha 1$ or $\alpha 2$ in FIG. 5, the optical path of light incident on side surfaces or transmitted light thereof can be changed with good perpendicularity with respect to the reference plane so that display light excellent in frontal directivity can be obtained efficiently.

If the inclination angle of the optical path changing slopes is lower than 35 degrees, the optical path of the reflected light is displaced largely from the frontal direction. As a result, the reflected light can be hardly utilized effectively for display, and frontal luminance becomes low. On the contrary, if the inclination angle is higher than 48 degrees, light leaking from the optical path changing slopes increases due to the contrariety to the condition that light incident on side surfaces or transmitted light thereof is totally reflected. As a result, the efficiency of utilizing the light incident on the side surfaces becomes low.

From the point of view of changing the optical path with excellent frontal directivity and restraining light from leaking, the inclination angle of the optical path changing slopes A1 or B1 is preferably selected to be in a range of from 38 to 45 degrees, particularly in a range of from 40 to 44 degrees in consideration of the total reflection condition based on refraction of the light transmitted through the inside of the liquid-crystal display panel in accordance with Snell's law. Incidentally, the total reflection condition for a glass plate is generally about 42 degrees. In this case, light incident on the side surface is made incident on the optical path changing slopes while the light is transmitted in a state in which the light is concentrated in a range of ±42 degrees.

As described above, the light output means A or B having the optical path changing slopes A1 or B1 are formed as a plurality of light output means as shown in FIGS. 7, 8, 11–14 in order to attain reduction in thickness of the optical path control layer. In this case, from the point of view of reflecting light incident on side surfaces backward and efficiently transmitting the reflected light to opposite side surfaces to thereby emit the light from the whole surface of the liquid-crystal display screen as uniformly as possible, it is preferable to use a structure including gentle slopes A2 or B2 each inclined at an inclination angle of not higher than 10 degrees, particularly not higher than 5 degrees, more particularly not higher than 3 degrees with respect to the reference plane, or including flat surfaces A3 or B3 each inclined at an inclined angle of substantially 0 degrees with respect to the reference plane.

It is therefore preferable that the light output means A (B) including the steep slopes A2 (B2) as shown in FIG. 6B have a structure in which the inclination angle of the steep slopes A2 (B2) is selected to be not lower than 35 degrees, particularly not lower than 50 degrees, more particularly not lower than 60 degrees with respect to the reference plane, so that the flat surfaces A3 (B3) can be widened.

Figure 8:
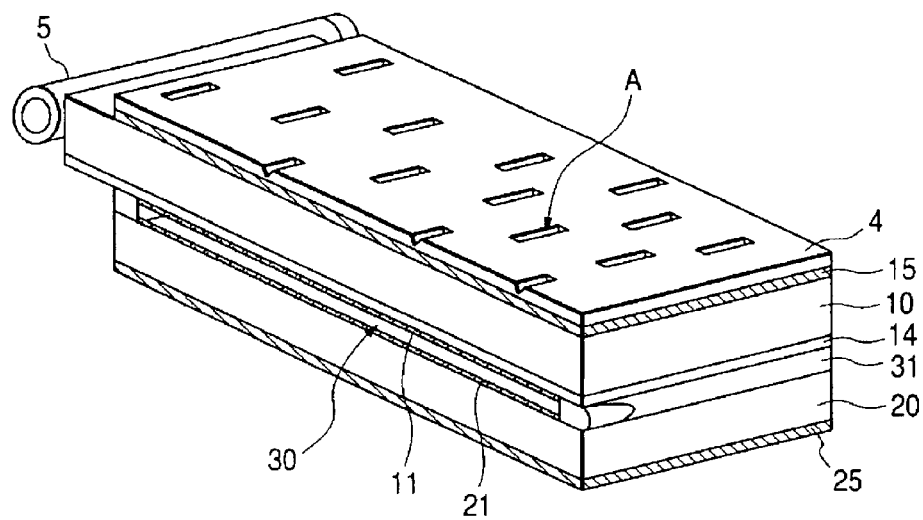
FIG. 8 is an explanatory perspective view of a liquid-crystal display device according to a further embodiment of the invention.
Figure 11:
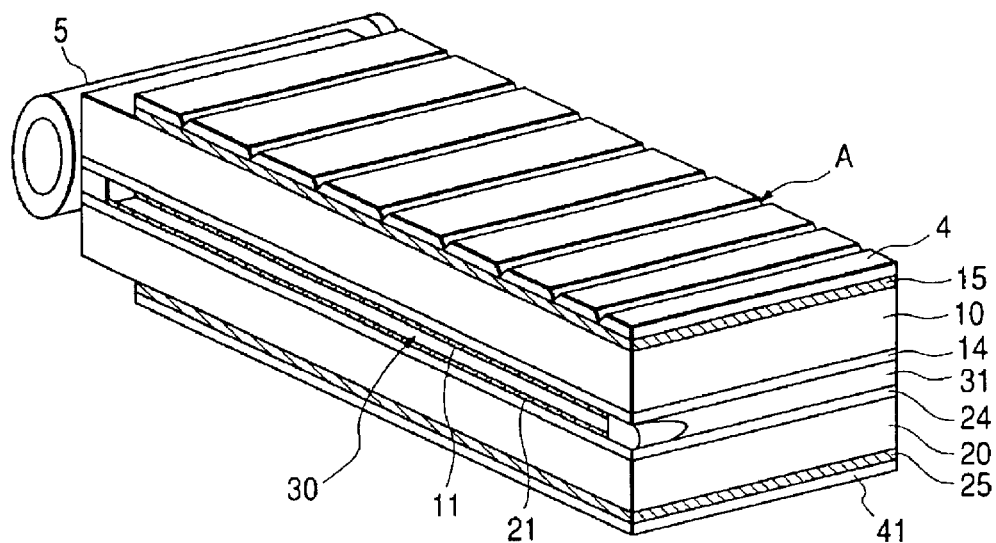
FIG. 11 is an explanatory perspective view of a liquid-crystal display device according to another embodiment of the invention.
Figure 12:
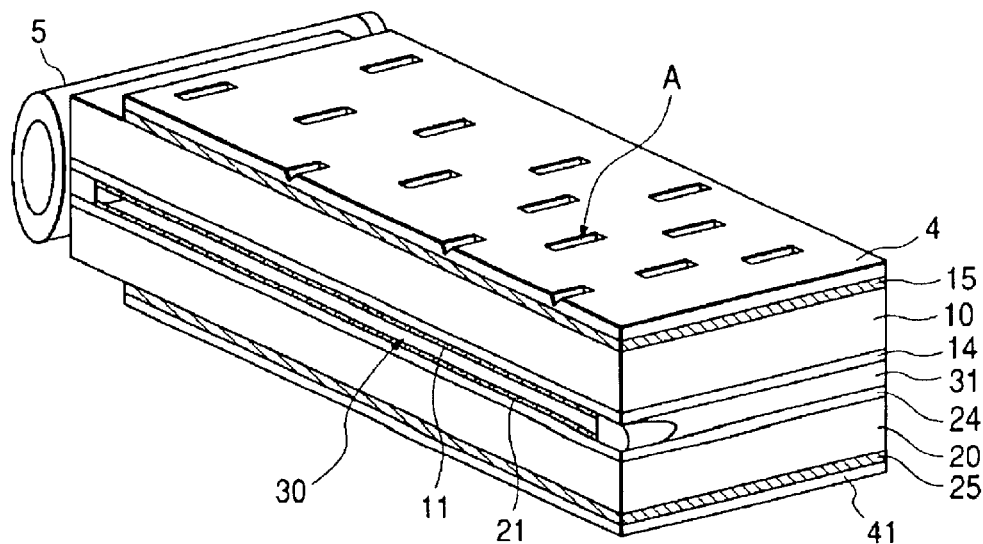
FIG. 12 is an explanatory perspective view of a liquid-crystal display device according to a further embodiment of the invention.
Figure 13:
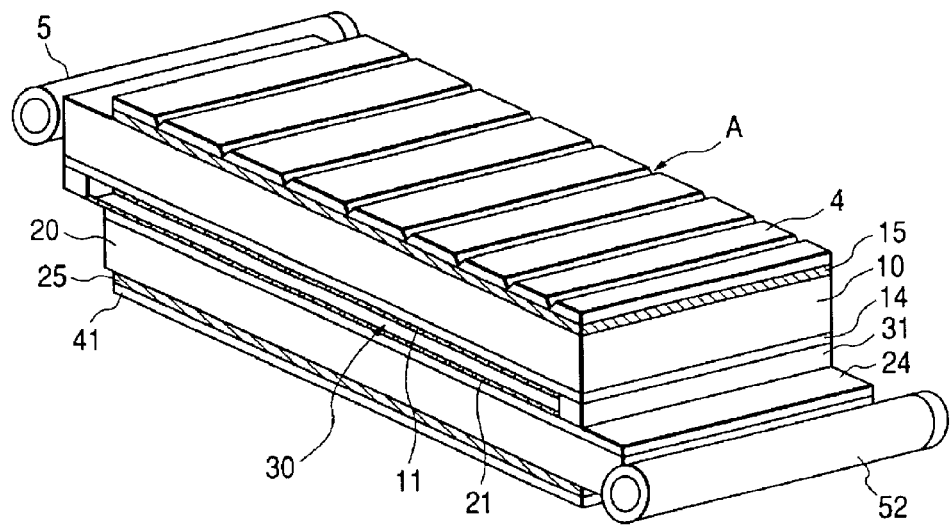
FIG. 13 is an explanatory perspective view of a liquid-crystal display device according to a further embodiment of the invention.
Figure 14:
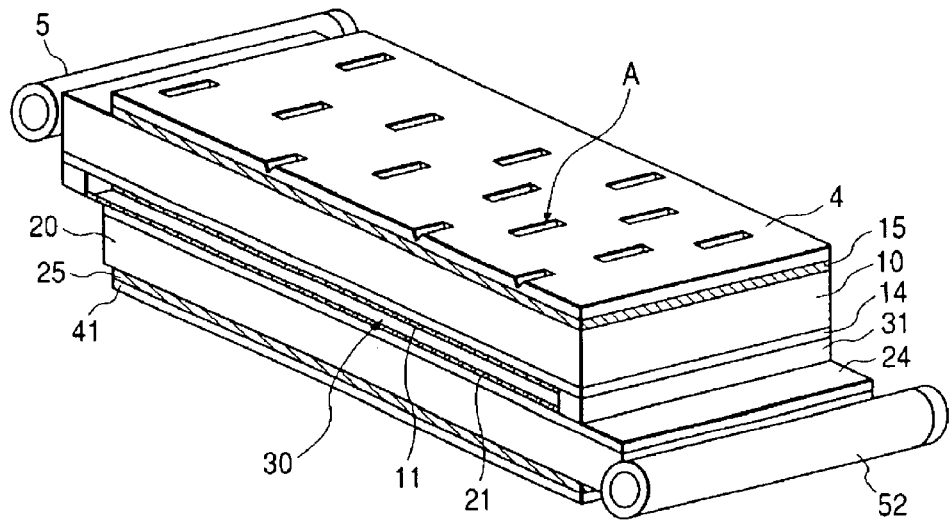
FIG. 14 is an explanatory perspective view of a liquid-crystal display device according to a still further embodiment of the invention.

As shown in FIGS. 7, 8, 11–14, the light output means A (B) are provided so that their ridgelines go parallel with or are inclined to the incidence side surface of the liquid-crystal display panel 1 on which the light source 5 (52) is disposed. In this case, the light output means A (B) may be formed continuously in a range of from one end of the optical path control layer to the other end as shown in FIGS. 7, 11, 13 or may be formed discontinuously and intermittently as shown in FIGS. 8, 12, 14.

When the light output means A (B) are formed discontinuously, it is preferable that the length of roughnesses, which are constituted by grooves or protrusions, in the direction along the incidence side surface is selected to be not smaller than 5 times as large as the depth or height of the roughnesses from the point of view of the incidence efficiency or optical path changing efficiency of the transmitted light. In addition, it is preferable that the length is selected to be not larger than 500 μm, particularly in a range of from 10 to 480 μm, more particularly in a range of from 50 to 450 μm, from the point of view of emitting uniform light from the display surface of the panel. Incidentally, the semi-transmission reflection layer is not shown in FIGS. 7, 8, 11–14.

There is no specific limit on the cross-sectional shape of the light output means A or B and the pitch of the optical path changing slopes A1 or B1. The optical path changing slopes A1 or B1 are luminance-determining factors in an illumination mode. Hence, the shape of the light output means A or B and the pitch of the optical path changing slopes A1 or B1 can be determined suitably in accordance with the uniformity of light emission from the display surface of the panel, so that the quantity of optical-path-changed light can be controlled by the distribution density of the optical path changing slopes A1 or B1.

Accordingly, the slopes may have a shape with a fixed inclination angle, or the like, on the whole surface of the optical path control layer. Alternatively, in order to cope with absorption loss or attenuation of the transmitted light due to the previous change of the optical path to thereby attain uniformity of light emission from the display surface of the panel, the light output means A (B) may be formed to become larger as the position in the light output means A (B) goes farther from the side surface where light is incident, as shown in FIG. 9.

Figure 9:
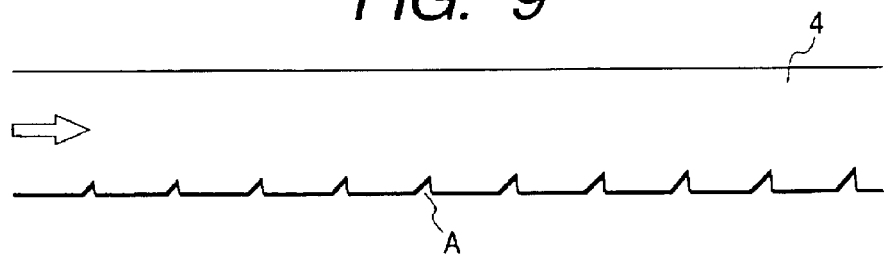
FIG. 9 is an explanatory side view showing an example of the optical path control layer.
Figure 10:
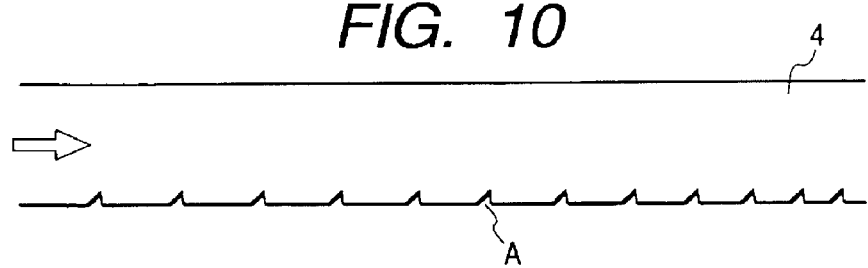
FIG. 10 is an explanatory side view showing another example of the optical path control layer.

Further, the light output means A (B) may be formed to have a fixed pitch as shown in FIG. 9, or may be formed to have a pitch which is reduced gradually to increase the distribution density of the light output means A (B) as the position in the light output means A (B) goes farther from the side surface where light is incident, as shown in FIG. 10. Further, uniform light emission from the display surface of the panel may be attained by random pitches.

In addition, when the light output means A (B) are roughnesses constituted by discontinuous grooves or protrusions, the size, shape, distribution density, ridgeline direction, etc. of the roughnesses may be made random, or the random or regular or standardized roughnesses may be arranged at random so that uniform light emission from the display surface of the panel can be attained. Hence, as described above in the examples, uniform light emission from the display surface of the panel can be achieved by application of a suitable method to the light output means A or B. Incidentally, the direction of the arrow in FIGS. 9 and 10 designates the direction of transmission of the light incident on the side surface.

As described above, the optical path changing slopes are functional portions for substantially forming illumination light by changing the optical path of light incident on the side surface. Accordingly, if the distance between adjacent optical path changing slopes is too large, illumination is sparse at the time of switching on the light source so that display may be unnatural. To prevent display from being unnatural, it is preferable that the pitch of the optical path changing slopes A1 or B1 is selected to be not larger than 2 mm, particularly in a range of from 20 μm to 1 mm, more particularly in a range of from 50 μm to 0.5 mm.

On the other hand, moire may occur because illumination light through a plurality of optical path changing slopes, particularly through optical path changing slopes continuous in a direction of the incidence side surface interferes with pixels of the liquid-crystal cell. Although moire can be prevented by adjustment of the pitch of the optical path changing slopes, there is a preferred range in the pitch as described above. Hence, measures against the case where moire still occurs in spite of the preferred range of the pitch become a subject of discussion.

In the case, there is preferably used a method in which the ridgelines of the roughnesses are formed to be inclined to the incidence side surface so that the optical path changing slopes can be arrayed to cross the pixels to thereby prevent moire. In this case, if the inclination angle of the ridgelines of the roughnesses with respect to the incidence side surface is too high, deflection may occur in reflection by the optical path changing slopes. As a result, large deviation may occur in the changed direction of the optical path. This is apt to cause lowering of display quality.

To prevent lowering of display quality from being caused by deviation in the changed direction of the optical path, therefore, the inclination angle of the ridgelines of the roughnesses with respect to the incidence side surface is preferably selected to be in a range of ±30 degrees, more preferably in a range of ±25 degrees. Incidentally, the sign "±" means the direction of inclination of the ridgelines with the incidence side surface as a reference. When the resolution of the liquid-crystal cell is too low to produce moire, or when moire is negligible, it is preferable that such ridgelines are formed to be as parallel with the incidence side surface as possible.

From this point of view and in consideration of the fact that the pixel pitch of the liquid-crystal cell is generally in a range of from 100 to 300 μm, it is preferable that the optical path changing slopes are formed so that the projected width thereof on the reference plane is not larger than 40 μm, particularly in a range of from 3 to 20 μm, more particularly in a range of from 5 to 15 μm. Because the coherence length of a fluorescent tube is generally set at about 20 μm, the projected width is preferred also from the point of view to prevent lowering of display quality from being caused by diffraction.

Each of the optical path control layers can be made of a suitable material exhibiting transparency in accordance with the wavelength range of light from the light source and having a refractive index higher than that of the low-refractive-index transparent layer. Incidentally, examples of the material used in a visible region may include polymer, curable resin, and glass, as described above in the description of the transparent protective layer. An optical path control layer made of a material exhibiting no birefringence or little birefringence is preferred.

From the point of view of suppressing the quantity of loss light which is confined in the panel because of interfacial reflection so as to be unable to emerge from the panel, and from the point of view of efficiently supplying light incident on the side surface or transmitted light thereof to the optical path control layer, particularly to the optical path changing slopes of the optical path control layer, it is preferable that the optical path control layer has a refractive index higher by 0.05 or more, particularly by 0.08 or more, more particularly by a value of from 0.1 to 0.4 than that of the low-refractive-index transparent layer.

In addition, from the point of view in which incident light from the light source or transmitted light thereof is made incident on the nearest optical path control layer from the back side or visual side substrate efficiently to achieve bright display through the optical path changing slopes, it is preferable that the optical path control layer is formed so that the refractive index difference between the optical path control layer and the nearest one of the back side and visual side substrates is not larger than 0.15, particularly not larger than 0.10, more particularly not larger than 0.05 and it is particularly preferable that the optical path control layer has a refractive index higher than that of the nearest substrate.

As shown in FIGS. 3 to 4, when the optical path control layers and the light sources are disposed on the back side and visual side substrates respectively as described above, increase in quantity of incident light on the whole liquid-crystal display panel can be attained in accordance with reduction in thickness of the cell substrates. As a result, bright display can be achieved. The sectional area of the incident side surface with respect to a light source can be made larger in the embodiments shown in FIGS. 3 and 4. If the thickness of each of the two substrates is same, the section area of the incident surface is made twice. Incidentally, the optical path control layers disposed on the back side and visual side substrates respectively may be of the same type having light output means formed in the same format, or of different types but having light output means formed in the same format, or of different types having light output means formed in different formats.

Each of the optical path control layers can be formed by a cutting method or by any other suitable method. Preferred examples of the method for producing the optical path control layer from the point of view of manufacturability may include: a method in which a thermoplastic resin is heated while pressed against a mold capable of forming a predetermined shape to thereby transfer the shape; a method in which a mold capable of forming a predetermined shape is filled with a hot-melted thermoplastic resin or a resin fluidized by heat or through a solvent; and a method in which a liquid resin such as a monomer or an oligomer polymerizable by heat or by ultraviolet rays or radial rays is polymerized in the condition that the liquid resin is cast in a mold capable of forming a predetermined shape or in the condition that the mold is filled with the liquid resin.

Examples of the method may further include: a method in which the liquid resin polymerizable by ultraviolet rays or radial rays is polymerized in the condition that a coating layer obtained by coating a support film with the liquid resin is molded in a mold capable of forming a predetermined shape; and a method in which the liquid resin is polymerized by irradiation with ultraviolet rays or radial rays in the condition that a mold capable of forming a predetermined shape is filled with the liquid resin and then a support film is disposed on the mold.

In the case, a transparent support film may be used so that an optical path control layer integrated with the film can be formed, or after the formation of an optical path control layer integrated with the support film, the optical path control layer constituted only by a molding layer based on the coating or filler layer may be separated from the support layer. In the latter, the support film need not be transparent. The separation can be achieved by a method of surface-treating the support film with a releasant.

Accordingly, the optical path control layer may be formed by provision of a predetermined form directly to the back side or visual side substrate, or the optical path control layer may be formed as a transparent sheet provided to have a predetermined form. The thickness of the optical path control layer can be determined suitably. Generally, the thickness is selected to be not larger than 300 µm, particularly in a range of from 5 to 200 µm more particularly in a range of from 10 to 100 µm, from the point of view of reduction in thickness. Incidentally, the cross-sectional shape of each of the light output means, such as a triangular shape, a quadrangular shape or a pentagonal shape, does not mean a polygonal shape strictly. That is, rounding of corner portions, angular changing of surfaces, etc. on the basis of production techniques may be allowed.

The optical path control layers are disposed on the back side or the back side and visual side of the liquid-crystal display panel. In this case, the slope-forming surfaces, that is, the surfaces where the light output means A and B are formed, are preferably disposed on the outer surface sides as shown in FIGS. 1 to 5 in order to improve the efficiency of reflection by the optical path changing slopes A1 and B1 of the light output means A and B and, accordingly, to improve luminance due to effective utilization of light incident on side surfaces.

The optical path control layers, particularly the visual-side optical path control layer, may be subjected to a non-glare treatment or an anti-reflection treatment for preventing viewing from being disturbed by surface reflection of external light. The non-glare treatment can be performed to form a surface of the optical path control layer as a fine roughness structure. Various methods may be used for the non-glare treatment. Examples of the methods include: a surface roughening method such as a sandblasting method, or an embossing method; a method of mixing transparent particles such as silica particles; and a method of applying a resin containing transparent particles. The anti-reflection treatment can be made by a method of forming an interference deposited film.

Alternatively, the non-glare treatment or anti-reflection treatment can be made by a method of bonding a film having a surface fine roughness structure or an interference film. Incidentally, two polarizers may be provided on opposite surfaces of the liquid-crystal cell respectively as shown in the drawings, or one polarizer may be provided on only one surface of the liquid-crystal cell. The technique for forming the surface fine roughness structure can be applied to the case where surfaces of the light-diffusing layer, the semi-transmission reflection layer or/and the transparent substrate are provided as roughness type light scattering surfaces. The transparent particles to be mixed with the pressure sensitive adhesive layer may be also used in the non-glare treatment.

When the optical path control layer is formed independently as a transparent sheet as described above, it is preferable, from the point of view of improvement in luminance due to effective utilization of light incident on side surfaces that the transparent sheet is bonded to the liquid-crystal display panel through an adhesive layer 18 or 28 having a refractive index higher than that of the nearest low-refractive-index transparent layer 14 or 24, particularly through an adhesive layer having a refractive index as equal to that of the transparent sheet as possible, more particularly through an adhesive layer having a refractive index between that of the transparent sheet and that of the back side or visual side substrate.

Hence, the refractive index of the adhesive layer can be set in accordance with the optical path control layer. That is, it is preferable that the refractive index of the optical path control layer and the adhesive layer is higher by at least 0.05 than that of the nearest low-refractive-index transparent layer. The adhesive layer can be made of any suitable transparent adhesive agent without any specific limitation in kind. A bonding method using a pressure sensitive adhesive layer is preferred from the point of view of facilitating the bonding treatment. The pressure sensitive adhesive layer can be set in accordance with the previous description and may be provided as the light-diffusing type pressure sensitive adhesive layer.

As shown in FIGS. 1 to 5, a light-reflecting layer 6 may be disposed on the outside of the back side optical path control layer 4 in accordance with necessity. When light reflected by the back side optical path control layer is reflected and inverted by the semi-transmission reflection layer in the inside of the liquid-crystal cell, there is the possibility that the light cannot emerge from the liquid-crystal display device. Therefore, the light-reflecting layer is provided for reflecting and inverting the light again to return the light toward the liquid-crystal cell to thereby improve light-utilizing efficiency and, accordingly, improve luminance.

The light-reflecting layer is also effective in reflecting and inverting light reflected by the visual side optical path control layer and transmitted through the semi-transmission reflection layer, and in reflecting and inverting external light transmitted through the semi-transmission reflection layer in an external light mode to return the light toward the liquid-crystal cell to thereby improve light-utilizing efficiency and, accordingly, improve luminance. The light-reflecting layer is further effective in reflecting and inverting light leaking from the back side optical path control layer to make the light enter the back side optical path control layer again to thereby improve light-utilizing efficiency.

The light-reflecting layer can be made of a suitable material such as a white sheet in accordance with the related art. Particularly, examples of the light-reflecting layer include: a coating layer of a binder resin containing powder of a high-reflectance metal such as aluminum, silver, gold, copper, or chromium, or powder of an alloy of the high-reflectance metal; a layer of a metal thin film formed from the metal or a dielectric multilayer film by a suitable thin-film forming method such as a vacuum vapor deposition method or a sputtering method; a reflecting sheet having the coating layer or the deposited layer supported by a base material made of a film; and a high-reflectance light-reflecting layer made of metal foil. Particularly, a light-reflecting layer at least having a metal thin film is preferred from the point of view of reflecting efficiency. Incidentally, the technique used for forming the light-reflecting layer can be also used for forming the semi-transmission reflection layer.

The light-reflecting layer may be disposed on the rear surface of the back side optical path control layer so as to closely adhere thereto without any gap. The formation of the light-reflecting layer closely adhering to the rear surface of the back side optical path control layer without any gap can be performed, for example, by a method of forming a metal thin film by vacuum vapor deposition, or by a method of bonding a filmy flexible light-reflecting layer in accordance with the shape of the optical path control layer. In the latter method, the refractive index of the adhesive layer is preferably selected to be lower than that of the optical path control layer so that transmitted light can be transmitted efficiently by total reflection based on the refractive index difference in the interface between the adhesive layer and the optical path control layer.

The light-reflecting layer may be provided so as to closely adhere to the rear surface of the back side optical path control layer 4 but separated from the light output means A of the back side optical path control layer 4 as shown in FIGS. 2, 4 and 5, or may be provided so as to be separated from the rear surface of the back side optical path control layer 4. For the formation of the light-reflecting layer which is disposed so that an air layer is interposed between the light-reflecting layer and the optical path control layer, there may be preferably used a high-reflectance metal sheet, a reflecting sheet made up of a high-reflectance metal thin film provided on a support base material such as a film, or a white film such as a foamed plastic film.

Incidentally, in the examples of FIGS. 2, 4 and 5, a light-reflecting layer 6b is made up of a metal thin film provided on a support base material 6a and is bonded to the optical path control layer 4 through an adhesive layer 6c having a refractive index lower than that of the optical path control layer 4 in order to improve light-utilizing efficiency. Incidentally, the light-reflecting layer made up of a reflecting sheet as described above may closely surround the light source disposed on a side surface of the back side substrate or/and the light source disposed on a side surface of the visual side substrate so that the light-reflecting layer can serve also as a light source holder defined above. This technique is advantageous in terms of improvement in luminance because light from the light source can be highly concentrated onto the side surface of the substrate.

The light-reflecting layer may form a specular surface or may be preferably formed to have a light-diffusing function from the point of view of preventing moire. As described above, the light-reflecting layer may be simply put on the outside of the back side optical path control layer or may be disposed so as to adhere closely to the back side optical path control layer by a bonding method, a vapor deposition method, or the like. When the light-reflecting layer is disposed so as to adhere closely to the slopes of the light output means as shown in FIGS. 1 and 3, there is an advantage in that the reflecting effect can be improved to thereby prevent leaking light almost perfectly to improve viewing angle characteristic and luminance more greatly.

The formation of the light-diffusing type reflecting layer can be performed, for example, by a method having: the step of preparing a support base material such as a film having a surface formed as a fine roughness structure by a suitable method such as a surface roughening method using sand-blasting or matting, or a particle adding method; and the step of providing a light-reflecting layer on the support base material so that the fine roughness structure is reflected in the light-reflecting layer. For example, the light-reflecting layer can be formed in such a manner that a metal is provided on the surface of the support base material by a suitable vapor deposition or plating method such as a vacuum vapor deposition method, an ion-plating method, or a sputtering method. This technique used for forming the light-diffusing type reflecting layer can be also used for forming the semi-transmission reflection layer.

In the liquid-crystal display device according to the invention, a large part of light incident on the incidence side surfaces in an illumination mode is transmitted backward through reflection based on the law of refraction through the back side and visual side substrates. Hence, while the large part of the light is prevented from emerging (leaking) from the surface of the panel, the optical path of light incident on the optical path changing slopes A1 and B1 of the optical path control layers is efficiently changed to the front and back directions of the panel with good vertical directivity. The other part of the transmitted light is further transmitted backward by total reflection so as to be made incident on the optical path changing slopes A1 and B1 in the rear. Hence, the optical path of the other part of the transmitted light is efficiently changed to the front and back directions of the panel with good vertical directivity.

Then, the light having the optical path changed by the optical path changing slopes reaches the semi-transmission reflection layer. A part of light (on the backside) transmitted through the semi-transmission reflection layer and the other part of light (on the visual side) reflected by the semi-transmission reflection layer enter the liquid-crystal cell to thereby form display light. Hence, display excellent in uniformity of brightness on the whole display surface of the panel is achieved in an illumination mode. On the other hand, external light incident on the visual side in an external light mode reaches the semi-transmission reflection layer. Light reflected by the semi-transmission reflection layer enters the liquid-crystal cell to thereby form display light. Hence, display excellent in uniformity of brightness on the whole display surface of the panel is achieved in an external light mode.

When a light-reflecting layer is provided on the outside of the back side optical path control layer, light-utilizing efficiency is improved as described above, so that brightness is improved more greatly. Hence, there can be formed a liquid-crystal display device which is bright, easy to view and excellent in display quality because light from the light sources can be utilized efficiently and which can be used both in an external light mode and in an illumination mode.

Incidentally, in the invention, optical elements or components such as an optical path control layer, a liquid-crystal cell, a polarizer, and a phase retarder for forming the liquid-crystal display device may be wholly or partially integrally laminated/fixed onto one another or may be disposed to be easily separable from one another. From the point of view of preventing lowering of contrast due to suppression of interfacial reflection, it is preferable that such optical elements or components are fixed onto one another. A transparent adhesive layer made of a suitable transparent adhesive agent such as a tackifier can be used for the fixing/bonding process. The transparent adhesive layer may contain the transparent particles so that the adhesive layer exhibits a diffusing function.

In addition, the optical elements or components, particularly those on the visual side, may be formed to have ultraviolet light absorptive power, for example, by a method of treating them with an ultraviolet light absorbent such as a salicylic ester-based compound, a benzophenone-based compound, a benzotriazole-based compound, a cyanoacrylate-based compound or a nickel complex-based compound.

REFERENCE EXAMPLE 1

Magnesium fluoride vapor was vacuum-deposited on a non-alkali glass plate having a thickness of 0.7 mm and a refractive index of 1.52 to thereby form a low-refractive-index transparent layer having a thickness of 600 nm and a refractive index of 1.38. A resin layer of a surface fine roughness structure was provided on the low-refractive-index transparent layer. Then, aluminum vapor was vacuum-deposited on the resin layer, and 250 μm-square openings were formed by an etching method so as to be distributed evenly with a numerical aperture of 20%. Thus, a half-transmission reflecting layer was provided to serve also as an electrode. The half-transmission reflecting layer was spin-coated with a polyvinyl alcohol solution and the dried film of the polyvinyl alcohol solution was subjected to a rubbing treatment to thereby obtain a back side substrate. On the other hand, an ITO transparent electrically conductive layer was formed on a non-alkali glass plate provided in the same manner as described above. After the transparent electrode was divided by etching, a film subjected to a rubbing treatment was provided thereon to thereby obtain a visual side substrate.

Then, a gap adjusting material was disposed between the back side and visual side substrates while the rubbing surfaces of the two substrates were disposed opposite to each other so that the rubbing directions were perpendicular to each other. After the periphery of the two substrates was sealed with an epoxy resin, liquid crystal (ZLI-4792 made by MEPCK) was injected between the two substrates to thereby form a TN liquid-crystal cell. Phase retarder-containing polarizers were stuck onto opposite surfaces of the liquid-crystal cell to thereby obtain a normally white liquid-crystal panel. The panel size was 25 mm wide and 34 mm long. Aside surface of the backside substrate in a direction of the length thereof was protruded by about 2 mm from the visual side substrate. Then, a cold-cathode tube was disposed on the protruded side surface of the back side substrate. While the cold-cathode tube was surrounded by a silver-deposited polyester film, end portions of the film were bonded to front and rear surfaces of the substrate by a double-sided pressure-sensitive adhesive tape to thereby retain and fix the cold-cathode tube.

REFERENCE EXAMPLE 2

A normally white liquid-crystal panel having cold-cathode tubes held on opposite side surfaces was obtained in the same manner as in Reference Example 1 except that the low-refractive-index transparent layer of magnesium fluoride was not provided on the back side substrate.

REFERENCE EXAMPLE 3

An acrylic-based ultraviolet-curable resin (ARONIX UV-3701 made by TOAGOSEI CO., LTD.) was dropped by a dropper into a mold processed into a predetermined shape in advance so that the mold was filled with the acrylic-based ultraviolet-curable resin. A 60 μm-thick polycarbonate (PC) film was quietly placed on the acrylic-based ultraviolet-curable resin and then stuck closely thereto by a rubber roller so that a surplus of the resin and air bubbles were removed. Then, the acrylic-based ultraviolet-curable resin was irradiated with ultraviolet rays by a metal halide lamp so that the resin was cured. Then, the resin with the PC film was released from the mold and cut into a predetermined size. The PC film was released from the resin. Thus, an optical path control layer (transparent sheet) having a refractive index of 1.51 was obtained. An acrylic-based pressure sensitive adhesive layer having a refractive index of 1.51 was attached to a surface of the transparent sheet where the optical path control layer was not provided.

Incidentally, the transparent sheet was 22 mm wide and 28 mm long. The transparent sheet had prism-like concave portions disposed continuously at intervals of a pitch of 190 μm and having ridgelines inclined at an angle of 21 degrees in the widthwise direction. Each of the prism-like concave portions had an optical path changing slope A1 and a steep slope A2 (FIG. 6B). The inclination angle of each of the optical path changing slopes A1 was 42 degrees. The vertical angle between the optical path changing slope A1 and the steep slope A2 was 70 degrees. The projected width of each of the optical path changing slopes A1 on the reference plane was in a range of from 7 to 12 μm. The area of flat portions A3 was not smaller than 10 times as large as the total projected area of the optical path changing slopes A1 and the steep slopes A2 on the reference plane.

REFERENCE EXAMPLE 4

A pressure sensitive adhesive layer-including transparent sheet was obtained in the same manner as in Reference Example 3 except that another different mold was used. The transparent sheet had light output means (FIG. 6B) which were 80 μm long. Each of the light output means had an optical path changing slope A1, and a steep slope A2. The inclination angle of each of the optical path changing slopes A1 was about 42 degrees The projected width of each of the optical path changing slopes A1 on the reference plane was 10 μm. The inclination angle of each of the steep slopes A2 was about 75 degrees. The direction of the length of the light output means was parallel with an incidence side surface. The light output means were disposed gradually densely as the position in the light output means was farther from the incidence side surface in the lengthwise direction (FIGS. 8, 10, 12 and 14). The area of flat portions A3 was not smaller than 10 times as large as the total projected area of the optical path changing slopes A1 and the steep slopes A2 on the reference plane.

REFERENCE EXAMPLE 5

A pressure sensitive adhesive layer-including transparent sheet was obtained-in the same manner as in Reference Example 3 except that a mold having a surface roughened by sandblasting was used.

REFERENCE EXAMPLE 6

A pressure sensitive adhesive layer-including transparent sheet was obtained in the same manner as in Reference Example 3 except that a further different mold was used. The transparent sheet had prism-like concave portions disposed continuously at intervals of a pitch of 190 μm (FIG. 6B). Each of the prism-like concave portions had an optical path changing slope A1, and a steep slope A2. The inclination angle of each of the optical path changing slopes A1 was 30 degrees. The vertical angle between the optical path changing slope A1 and the steep slope A2 was 70 degrees The projected width of each of the optical path changing slopes A1 on the reference plane was in a range of from 7 to 12 μmn. The area of flat portions A3 was not smaller than 10 times as large as the total projected area of the optical path changing slopes A1 and the steep slopes A2 on the reference plane.

REFERENCE EXAMPLE 7

An optical path control layer was formed in the same manner as in Reference Example 3. Aluminum was applied on a light output means-forming surface of the optical path control layer by vacuum vapor deposition. Thus, a transparent sheet having a light-reflecting layer provided on the optical path control layer was obtained.

REFERENCE EXAMPLE 8

Aluminum was applied on a surface of a transparent plastic film by vacuum vapor deposition. Thus, a light-reflecting sheet was obtained.

REFERENCE EXAMPLE 9

Aluminum was applied on a surface of a transparent plastic film by vacuum vapor deposition. A pressure sensitive adhesive layer having a refractive index of 1.41 was formed on the aluminum. Thus, a light-reflecting sheet was obtained.

Example 1

A transparent sheet obtained in Reference Example 3 was bonded, through its pressure sensitive adhesive layer, to the back side of a liquid-crystal panel obtained in Reference Example 1. A light-reflecting sheet obtained in Reference Example 8 was bonded to the back side of the transparent sheet through a pressure sensitive adhesive layer provided on only the periphery. Thus, a liquid-crystal display device was obtained.

Example 2

A transparent sheet obtained in Reference Example 3 was bonded, through its pressure sensitive adhesive layer, to the back side of a liquid-crystal panel obtained in Reference Example 1. A light-reflecting sheet obtained in Reference Example 9 was bonded to the back side of the transparent sheet through a pressure sensitive adhesive layer. Thus, a liquid-crystal display device was obtained.

Example 3

A transparent sheet obtained in Reference Example 4 was bonded, through its pressure sensitive adhesive layer, to the back side of a liquid-crystal panel obtained in Reference Example 1. A light-reflecting sheet obtained in Reference Example 8 was bonded to the back side of the transparent sheet through a pressure sensitive adhesive layer provided on only the periphery thereof. Thus, a liquid-crystal display device was obtained.

Example 4

A transparent sheet obtained in Reference Example 7 was bonded, through its pressure sensitive adhesive layer, to the back side of a liquid-crystal panel obtained in Reference Example 1. Thus, a liquid-crystal display device was obtained.

Comparative Example 1

A transparent sheet obtained in Reference Example 3 was bonded, through its pressure sensitive adhesive layer, to the back side of a liquid-crystal panel obtained in Reference Example 2. A light-reflecting sheet obtained in Reference Example 8 was bonded to the back side of the transparent sheet through a pressure sensitive adhesive layer provided on only the periphery thereof. Thus, a liquid-crystal display device was obtained.

Comparative Example 2

A transparent sheet obtained in Reference Example 3 was bonded, through its pressure sensitive adhesive layer, to the back side of a liquid-crystal panel obtained in Reference Example 2. A light-reflecting sheet obtained in Reference Example 9 was bonded to the back side of the transparent sheet through a pressure sensitive adhesive layer. Thus, a liquid-crystal display device was obtained.

Comparative Example 3

A transparent sheet obtained in Reference Example 5 was bonded, through its pressure sensitive adhesive layer, to the back side of a liquid-crystal panel obtained in Reference Example 1. A light-reflecting sheet obtained in Reference Example 8 was bonded to the back side of the transparent sheet through a pressure sensitive adhesive layer provided on only the periphery thereof. Thus, a liquid-crystal display device was obtained.

Comparative Example 4

A transparent sheet obtained in Reference Example 6 was bonded, through its pressure sensitive adhesive layer, to the back side of a liquid-crystal panel obtained in Reference Example 1. A light-reflecting sheet obtained in Reference Example 8 was bonded to the back side of the transparent sheet through a pressure sensitive adhesive layer provided on only the periphery thereof. Thus, a liquid-crystal display device was obtained.

Evaluation Test 1

Frontal luminance in the center position of the liquid-crystal display device obtained in each of Examples and Comparative Examples was measured in a dark room by a luminance meter (BM-7 made by TOPCON CORP.) while the cold-cathode tube was switched on in the condition that the liquid-crystal cell was supplied with no voltage. Further, display quality was evaluated in the case where display in an illumination mode was observed at the incidence side surface end, at the center portion and at the opposite end. The case where the display device was bright and excellent in uniformity of brightness so that light emerged efficiently was evaluated as "○". The case where the display device was slightly inferior in brightness and uniformity of brightness was evaluated as "Δ". The case where the display device was dark and uneven in brightness was evaluated as "X".

Results of the measurement were shown in the following table.

|  | Frontal Luminance (cd/m$^2$) | Display Quality | | |
| --- | --- | --- | --- | --- |
|  |  | Incidence Side Surface End | Center Portion | Opposite End |
| Example 1 | 58 | ○ | ○ | ○ |
| Example 2 | 42 | ○ | ○ | ○ |
| Example 3 | 51 | ○ | ○ | ○ |
| Example 4 | 44 | ○ | ○ | Δ |
| Comparative Example 1 | 29 | ○ | Δ | Δ |
| Comparative Example 2 | 25 | ○ | Δ | X |
| Comparative Example 3 | 21 | Δ | Δ | X |
| Comparative Example 4 | 19 | Δ | Δ | X |

It was apparent from the table that bright and uniform display in an illumination mode was achieved in Examples whereas very dark or uneven display occurred in Comparative Examples. It was also apparent that brightness and its uniformity were high in Examples 1 and 2 in which the low-refractive-index transparent layer was provided, whereas unevenness of brightness supposed to be affected by the half-transmission reflecting layer was so high that display became dark rapidly as the position became farther from the incidence side surface in Comparative Examples 1 and 2 in which the low-refractive-index transparent layer was not provided. In Comparative Examples 1 and 2, display was very hard to view.

In addition, in Comparative Example 3 in which the optical path control layer surface was roughened and in Comparative Example 4 in which the inclination angle of the optical path changing slopes of the optical path control layer was low, light did not emerge effectively so that display was dark. In any case of Examples and Comparative Examples, display in an external light mode was easy to view. The influence of the low-refractive-index transparent layer was not observed. It is proved from the description that a thin and lightweight liquid-crystal display device in which light can be emitted simply when a light source unit is provided on an end surface of a liquid-crystal panel without use of any light pipe and which can be used both in an external light mode and in an illumination mode can be achieved according to the invention.

REFERENCE EXAMPLE 10

A back side substrate was formed in the same manner as the Reference Example. On the other hand, a low-refractive-index transparent layer and an ITO transparent electrically conductive layer were formed on a non-alkali glass plate provided in the same manner as described above. After the transparent electrode was divided into two by etching, a film subjected to a rubbing treatment was provided thereon to thereby obtain a visual side substrate.

Then, a gap adjusting material was disposed between the back side and visual side substrates while the rubbing surfaces of the two substrates were disposed opposite to each other so that the rubbing directions were perpendicular to each other. After the periphery of the two substrates was sealed with an epoxy resin, liquid crystal (ZLI-4792 made by MERCK) was injected between the two substrates to thereby form a TN liquid-crystal cell. Phase retarder-including polarizers were stuck onto opposite surfaces of the liquid-crystal cell to thereby obtain a normally white liquid-crystal panel. The panel size was 25 mm wide and 34 mm long. Then, a cold-cathode tube was disposed on a side surface of the panel. While the cold-cathode tube was surrounded by a silver-deposited polyester film, end portions of the film were bonded to the back side and visual side substrates by a double-sided pressure-sensitive adhesive tape so as to be laid from an end portion of the rear surface of the back side substrate to an end portion of the front surface of the visual side substrate to thereby retain and fix the cold-cathode tube.

REFERENCE EXAMPLE 11

A liquid-crystal panel was obtained in the same manner as in Reference Example 10 except that the low-refractive-index transparent layers of magnesium fluoride were not provided on the back side and visual side substrates.

Example 5

Transparent sheets obtained in Reference Example 3 were bonded, through their pressure sensitive adhesive layers, to the back and visual sides of a liquid-crystal panel obtained in Reference Example 10. A light-reflecting sheet obtained in Reference Example 8 was bonded to the back side transparent sheet through a pressure sensitive adhesive layer provided on only the periphery. Thus, a liquid-crystal display device was obtained.

Example 6

A liquid-crystal display device was obtained in the same manner as in Example 1 except that the light-reflecting sheet was replaced by a light-reflecting sheet obtained in Reference Example 5.

Example 7

A liquid-crystal display device was obtained in the same manner as in Example 5 except that the transparent sheets obtained in Reference Example 3 were replaced by transparent sheets obtained in Reference Example 4.

Example 8

A liquid-crystal display device was obtained in the same manner as in Example 5 except that the transparent sheet obtained in Reference Example 3 was replaced by a transparent sheet obtained in Reference Example 7 as the back side transparent sheet and that the light-reflecting sheet obtained in Reference Example 8 was not used.

Example 9

A liquid-crystal display device was obtained in the same manner as in Example 5 except that the transparent sheet obtained in Reference Example 3 was replaced by a transparent sheet obtained in Reference Example 4 as the back side transparent sheet.

Comparative Example 6

A liquid-crystal display device was obtained in the same manner as in Example 5 except that the liquid-crystal panel obtained in Reference Example 10 was replaced by a liquid-crystal panel obtained in Reference Example 11.

Comparative Example 6

A liquid-crystal display device was obtained in the same manner as in Example 6 except that the liquid-crystal panel obtained in Reference Example 10 was replaced by a liquid-crystal panel obtained in Reference Example 11.

Comparative Example 7

A liquid-crystal display device was obtained in the same manner as in Example 5 except that the transparent sheets obtained in Reference Example 3 were replaced by transparent sheets obtained in Reference Example 5.

Comparative Example 8

A liquid-crystal display device was obtained in the same manner as in Example 5 except that the transparent sheets obtained in Reference Example 3 were replaced by transparent sheets obtained in Reference Example 6.

Comparative Example 9

A liquid-crystal display device was obtained in the same manner as in Example 5 except that the transparent sheet obtained in Reference Example 3 was not disposed on the visual side.

Comparative Example 10

A liquid-crystal display device was obtained in the same manner as in Example 5 except that the transparent sheet obtained in Reference Example 3 was not disposed on the back side.

Evaluation Test 2

Frontal luminance in the center position of the liquid-crystal display device obtained in each of Examples and Comparative Examples was measured in a dark room by a luminance meter (BM-7 made by TOPCON CORP.) while the cold-cathode tube was switched on in the condition that the liquid-crystal cell was supplied with no voltage. Further, display quality was evaluated in the case where display in an illumination mode was observed at the incidence side surface end, at the center portion and at the opposite end. The case where the display device was bright and excellent in uniformity of brightness so that light emerged efficiently was evaluated as "◯". The case where the display device was slightly inferior in brightness and uniformity of brightness was evaluated as "Δ". The case where the display device was dark and uneven in brightness was evaluated as "X".

Results of the measurement were shown in the following table.

|  | Frontal Luminance (cd/m²) | Display Quality |||
| --- | --- | --- | --- | --- |
|  |  | Incidence Side Surface End | Center Portion | Opposite End |
| Example 5 | 83 | ◯ | ◯ | ◯ |
| Example 6 | 77 | ◯ | ◯ | ◯ |
| Example 7 | 79 | ◯ | ◯ | ◯ |
| Example 8 | 72 | ◯ | ◯ | Δ |
| Example 9 | 84 | ◯ | ◯ | Δ |
| Comparative Example 5 | 35 | ◯ | X | X |
| Comparative Example 6 | 30 | ◯ | X | X |
| Comparative Example 7 | 23 | Δ | Δ | X |
| Comparative Example 8 | 34 | ◯ | Δ | X |
| Comparative Example 9 | 47 | ◯ | ◯ | Δ |
| Comparative Example 10 | 42 | ◯ | ◯ | Δ |

It was apparent from the table that bright and uniform display in an illumination mode was achieved in Examples whereas very dark or uneven display occurred in Comparative Examples. It was also apparent that brightness and its uniformity were high in Examples 5 and 6 in which the low-refractive-index transparent layers were provided, whereas unevenness of brightness supposed to be affected by the half-transmission reflecting layer was so high that display became dark rapidly as the position became farther from the incidence side surface in Comparative Examples 5 and 6 in which the low-refractive-index transparent layers were not provided. In Comparative Examples 1 and 2, display was very hard to view. It was further apparent that bright and good illumination was achieved even in Example 8 in which the light-reflecting layer closely adhered to the optical path control layer without any gap and even in Example 9 in which the visual side optical path control layer was different in kind from the back side optical path control layer. It was further apparent that luminance was reduced to about a half in Comparative Examples 9 and 10 in which the optical path control layer was disposed on only one side, compared with Examples.

In addition, in Comparative Example 7 in which the optical path control layer surface was roughened and in Comparative Example 8 in which the inclination angle of the optical path changing slopes in the optical path control layer was low, light did not emerge effectively so that display was dark. In any case of Examples and Comparative Examples, display in an external light mode was easy to view. The influence of the low-refractive-index transparent layers was not observed. It is proved from the description that a thin and lightweight liquid-crystal display device in which light can be emitted simply when a light source unit is provided on an end surface of a liquid-crystal panel without use of any light pipe and which can be used both in an external light mode and in an illumination mode can be achieved according to the invention.

REFERENCE EXAMPLE 12

A back side substrate and a visual side substrate were formed in the same manner as Reference Example 10.

Then, a gap adjusting material was disposed between the back side and visual side substrates while the rubbing surfaces of the two substrates were disposed opposite to each other so that the rubbing directions were perpendicular to each other. After the periphery of the two substrates was sealed with an epoxy resin, liquid crystal (ZLI-4792 made by MERCK) was injected between the two substrates to thereby form a TN liquid-crystal cell. Phase retarder-containing polarizers were stuck onto opposite surfaces of the liquid-crystal cell to thereby obtain a normally white liquid-crystal panel. The panel size was 25 mm wide and 37 mm long. A side surface of one of the back side and visual side substrates in a direction of the length thereof was protruded by about 3 mm from a corresponding side surface of the other substrate. Then, 1.8 mm-diameter cold-cathode tubes were disposed on the protruded side surfaces of the back side and visual side substrates respectively and on opposite side surfaces of the panel so as to be opposite to each other with respect to the center of the panel. While the cold-cathode tubes were surrounded by silver-deposited polyester films respectively, end portions of the films were bonded to end portions of front and rear surfaces of the substrates by double-sided pressure-sensitive adhesive tapes to thereby retain and fix the cold-cathode tubes.

REFERENCE EXAMPLE 13

A liquid-crystal panel was obtained in the same manner as in Reference Example 12 except that the low-refractive-index transparent layers of magnesium fluoride were not provided on the back side and visual side substrates.

Example 10

Transparent sheets obtained in Reference Example 3 were bonded, through their pressure sensitive adhesive layers, to the back and visual sides of a liquid-crystal panel obtained in Reference Example 12 so that the optical path changing slopes of the transparent sheets faced corresponding light sources. A light-reflecting sheet obtained in Reference Example 8 was bonded to the back side transparent sheet through a pressure sensitive adhesive layer provided on only the periphery. Thus, a liquid-crystal display device was obtained.

Example 11

A liquid-crystal display device was obtained in the same manner as in Example 1 except that the light-reflecting sheet was replaced by a light-reflecting sheet obtained in Reference Example 9.

Example 12

A liquid-crystal display device was obtained in the same manner as in Example 10 except that the transparent sheets obtained in Reference Example 3 were replaced by transparent sheets obtained in Reference Example 4.

Example 13

A liquid-crystal display device was obtained in the same manner as in Example 10 except that the transparent sheet obtained in Reference Example 3 was replaced by a transparent sheet obtained in Reference Example 7 as the back side transparent sheet and that the light-reflecting sheet obtained in Reference Example 8 was not used.

Example 14

A liquid-crystal display device was obtained in the same manner as in Example 10 except that the transparent sheet obtained in Reference Example 3 was replaced by a transparent sheet obtained in Reference Example 4 as the back side transparent sheet.

Comparative Example 11

A liquid-crystal display device was obtained in the same manner as in Example 10 except that the liquid-crystal panel obtained in Reference Example 12 was replaced by a liquid-crystal panel obtained in Reference Example 13.

Comparative Example 12

A liquid-crystal display device was obtained in the same manner as in Example 11 except that the liquid-crystal panel obtained in Reference Example 12 was replaced by a liquid-crystal panel obtained in Reference Example 13.

Comparative Example 13

A liquid-crystal display device was obtained in the same manner as in Example 10 except that the transparent sheets obtained in Reference Example 3 were replaced by transparent sheets obtained in Reference Example 5.

Comparative Example 14

A liquid-crystal display device was obtained in the same manner as in Example 10 except that the transparent sheets obtained in Reference Example 3 were replaced by transparent sheets obtained in Reference Example 6.

Comparative Example 15

A liquid-crystal display device was obtained in the same manner as in Example 10 except that the transparent sheet obtained in Reference Example 3 was not disposed on the visual side.

Comparative Example 16

A liquid-crystal display device was obtained in the same manner as in Example 10 except that the transparent sheet obtained in Reference Example 3 was not disposed on the back side.

Evaluation Test 3

Frontal luminance in the center position of the liquid-crystal display device obtained in each of Examples and Comparative Examples was measured in a dark room by a luminance meter (BM-7 made by TOPCON CORP.) while the cold-cathode tubes were switched on in the condition that the liquid-crystal cell was supplied with no voltage. Further, display quality was evaluated in the case where display in an illumination mode was observed at the incidence side surface end, at the center portion and at the opposite end. The case where the display device was bright and excellent in uniformity of brightness so that light emerged efficiently was evaluated as "○". The case where the display device was slightly inferior in brightness and uniformity of brightness was evaluated as "Δ". The case where the display device was dark and uneven in brightness was evaluated as "X".

Results of the measurement were shown in the following table.

|  | Frontal Luminance $(cd/m^2)$ | Display Quality | | |
| --- | --- | --- | --- | --- |
|  |  | Incidence Side Surface End | Center Portion | Opposite End |
| Example 10 | 89 | ○ | ○ | ○ |
| Example 11 | 80 | ○ | ○ | ○ |
| Example 12 | 84 | ○ | ○ | ○ |
| Example 13 | 78 | ○ | ○ | Δ |
| Example 14 | 82 | ○ | ○ | Δ |
| Comparative Example 11 | 33 | ○ | X | X |
| Comparative Example 12 | 29 | ○ | X | X |
| Comparative Example 13 | 28 | Δ | Δ | X |
| Comparative Example 14 | 33 | ○ | Δ | X |
| Comparative Example 15 | 52 | ○ | Δ | Δ |
| Comparative Example 16 | 48 | ○ | Δ | Δ |

It was apparent from the table that bright and uniform display in an illumination mode was achieved in Examples whereas very dark or uneven display occurred in Comparative Examples. It was also apparent that brightness and its uniformity were high in Examples 10 and 11 in which the low-refractive-index transparent layers were provided, whereas unevenness of brightness supposed to be affected by the semi-transmission reflection layer was so high that display became dark rapidly as the position became farther from the incidence side surface in Comparative Examples 1 and 2 in which the low-refractive-index transparent layers were not provided. In Comparative Examples 11 and 12, display was very hard to view.

It was further apparent that bright and good illumination could be achieved even in Example 13 in which the light-reflecting layer closely adhered to the optical path control layer without any gap and even in Example 14 in which the visual side optical path control layer was different in kind from the back side optical path control layer. It was further apparent that luminance was reduced greatly in Comparative Examples 15 and 16 in which the optical path control layer was disposed on only one side, compared with Examples. In addition, in Comparative Example 13 in which the optical path control layer surface was roughened and in Comparative Example 14 in which the,inclination angle of each optical path changing slope of the optical path control layer was low, light did not emerge effectively so that display was dark.

On the other hand, Examples were observed while the cold-cathode tubes were one by one switched on. As a result, the light emergence angular characteristic in the visual side was quite different from that in the back side. That is, in any case of Examples, light emerged intensively in a direction opposite to the light source, so that the intensity of the light was asymmetric. The same phenomenon occurred also in Comparative Examples 15 and 16 in which the optical path control layer was formed on only one side, so that a large quantity of light emerged in a side opposite to the light source side with respect to the viewing angle. On the contrary, it was apparent that when the two cold-cathode tubes in Examples were switched on, light rays emerged at angles complementary to each other to thereby achieve effective illumination at a wider angle.

In any case of Examples and Comparative Examples, display in an external light mode was easy to view. The influence of the low-refractive-index transparent layers was not observed at all. It is proved from the description that a thin and lightweight liquid-crystal display device in which light can be emitted simply when light source units are provided on end surfaces of a liquid-crystal panel without use of any light pipe and which can be used both in an external light mode and in an illumination mode can be achieved according to the invention.

This invention should not be limited to the embodiments described above. Various modifications can be included in this invention within a range which can be easily realized by those skilled in the art without departing from the spirit of the scope of claim.

What is claimed is:

1. A liquid-crystal display device comprising:
    a liquid-crystal display panel;
    a light source disposed on a side surface of said liquid-crystal display panel; and
    an optical path control layer, wherein:
    said liquid-crystal display panel includes a liquid-crystal cell, said liquid-crystal cell having a back side substrate, a visual side substrate, and liquid crystal, said back side substrate at least having a transparent substrate, a low-refractive-index transparent layer lower in refractive index than said transparent substrate, and a semi-transmission reflection layer transmitting a part of light while reflecting the other part of the light, said visual side substrate having a transparent substrate and a transparent electrode, said liquid crystal being held between said back side substrate and said visual side substrate arranged so that said electrode and semi-transmission reflection layer are opposite to each other with respect to said liquid crystal, and
    said optical path control layer being provided on an outer side of said back side substrate, said optical path control layer having a plurality of optical path changing slopes inclined at an inclination angle of from 35 to 48 degrees with respect to a reference plane of a corresponding one of said two substrates, and having a refractive index higher than that of said low-refractive-index transparent layer.

2. A liquid-crystal display device according to claim 1, wherein said low-refractive-index transparent layer is located between said transparent substrate and said semi-transmission reflection layer so that said semi-transmission reflection layer serves also as an electrode.

3. A liquid-crystal display device according to claim 1, wherein said semi-transmission reflection layer has a roughness type light scattering surface, and is disposed, through said low-refractive-index transparent layer, on said transparent substrate forming said back side substrate, and a transparent electrode is disposed, through a surface-smooth transparent electrically insulating layer, on said semi-transmission reflection layer.

4. A liquid-crystal display device according to claim 1, further comprising a light reflecting layer disposed on an outer side of said optical path control layer.

5. A liquid-crystal display device according to claim 4, wherein said light reflecting layer at least includes a metal thin film.

6. A liquid-crystal display device according to claim 4, wherein said light reflecting layer closely adheres to said optical path control layer without any gap.

7. A liquid-crystal display device according to claim 4, wherein an air layer is interposed between said light reflecting layer and said optical path control layer.

8. A liquid-crystal display device according to claim 4, wherein said light reflecting layer is made of a filmy material and bonded to said optical path control layer by an adhesive layer having a refractive index lower than that of said optical path control layer.

9. A liquid-crystal display device according to claim 8, wherein said light reflecting layer at least includes a base film, and a metal thin film provided on said base film.

10. A liquid-crystal display device according to claim 1, wherein a refractive index difference between said transparent substrate forming said back side substrate and said low-refractive-index transparent layer is not smaller than 0.05.

11. A liquid-crystal display device according to claim 1, wherein said transparent substrate forming said back side substrate in said liquid-crystal cell is made of an optically isotropic material.

12. A liquid-crystal display device according to claim 1, wherein said liquid-crystal display panel further includes one polarizer disposed on at least one of opposite two surfaces of said liquid-crystal cell.

13. A liquid-crystal display device according to claim 12, wherein said liquid-crystal display panel further includes at least one phase retarder disposed between said liquid-crystal cell and said polarizer.

14. A liquid-crystal display device according to claim 1, wherein said optical path control layer includes a plurality of prism-like roughnesses having optical path changing slopes facing said light sources.

15. A liquid-crystal display device according to claim 14, wherein said prism-like roughnesses in said optical path control layers comprise concave portions each shaped like a triangle in cross section.

16. A liquid-crystal display device according to claim 15, wherein said concave portions comprise continuous grooves, each of which extends from one end of said optical path control layer to the other end thereof, in a direction parallel or inclined to said side surface of said liquid-crystal display panel on which said light source is disposed.

17. A liquid-crystal display device according to claim 15, wherein said concave portions comprise discontinuous grooves, each of which has a length not smaller than 5 times as large as its depth.

18. A liquid-crystal display device according to claim 17, wherein a direction of the length of said discontinuous grooves is parallel or inclined to said side surface of said liquid-crystal display panel on which said light source is disposed.

19. A liquid-crystal display device according to claim 14, wherein: at least two light sources are disposed on opposite two side surfaces of said back side substrate; and said prism-like roughnesses of said optical path control layer comprise concave or convex portions each shaped like a triangle or quadrangle in cross section, said triangle or quadrangle containing two optical path changing slopes facing said light sources, respectively.

20. A liquid-crystal display device according to claim 1, wherein said inclination angle of each of said optical path changing slopes in said optical path control layer is in a range of from 38 to 45 degrees.

21. A liquid-crystal display device according to claim 1, wherein said optical path control layers is made of a transparent sheet and is bonded to an outer surface side of said liquid-crystal display panel through an adhesive layer having a refractive index higher than that of the low-refractive-index transparent layer.

22. A liquid-crystal display device according to claim 21, wherein said adhesive layer comprises a pressure sensitive adhesive layer.

23. A liquid-crystal display device according to claim 1, wherein the refractive index of said optical path control layer and the refractive index of said adhesive layer are higher by at least 0.05 than that of the low-refractive-index transparent layer.

24. A liquid-crystal display device according to claim 1, wherein said light source is surrounded by a light-reflective light source holder and disposed and held on a side surface of said back side substrate in a manner in which end portions of upper and lower surfaces of said back side substrate are bonded to end portions of said light source holder.

25. A liquid-crystal display device according to claim 1, wherein said light source is arranged on side surfaces of said back side and visual side substrates.

26. A liquid-crystal display device according to claim 1, wherein a liquid-crystal drive circuit is formed between said low-refractive-index transparent layer and said semi-transmission reflection layer.

27. A liquid-crystal display device according to claim 1, wherein a side surface of said back side substrate is protruded more outward than a side surface of said visual side substrate, and said light source is disposed on the side surface of said back side substrate.

28. A liquid-crystal display device according to claim 1, wherein two or more light sources are disposed on said liquid crystal panel.

29. A liquid-crystal display device according to claim 28, wherein: said light sources are disposed on opposite side surfaces of said liquid crystal panel; and said optical path changing slopes of said optical path control layer comprise concave or convex portions each shaped like a triangle or quadrangle in cross section, said triangle or quadrangle containing two optical path changing slopes facing said light sources, respectively.

30. A liquid-crystal display device according to claim 1, wherein said light source is surrounded by a light-reflective light source holder and disposed and held on a side surface of said liquid crystal panel through said light source holder in a manner in which said light source straddles from an end portion of an upper surface of said visual side substrate to an end portion of a lower surface of said back side substrate.

31. A liquid-crystal display device according to claim 1, wherein said visual side substrate further includes a low-refractive-index transparent layer lower in refractive index than said transparent substrate; two or more light sources; and another optical path control layer being provided on an outer side of said visual side substrate.

32. A liquid-crystal display device according to claim 28, wherein the two or more light sources are disposed on side surfaces of said back side substrate and said visual side substrate and at least on said side surface and another side surface of said liquid-crystal display panel.

33. A liquid-crystal display device according to claim 28, further comprising a second low-refractive-index transparent layer, wherein: the second low-refractive-index transparent layer is located between the transparent substrate and the semi-transmission reflection layer of the back side substrate; and low-refractive-index transparent layer is located between the transparent substrate and the transparent electrode of the visual side substrate, respectively, so that said semi-transmission reflection layer serves also as an electrode.

34. A liquid-crystal display device according to claim 28, further comprising a light reflecting layer disposed on an outer side of said optical path control layer disposed on a back-side substrate side.

35. A liquid-crystal display device according to claim 28, wherein a refractive index difference between said transparent substrate forming said back side or visual side substrate and the low-refractive-index transparent layer is not smaller than 0.05.

36. A liquid-crystal display device according to claim 28, wherein: said light sources are disposed on opposite side surfaces of at least one of said back side and visual side substrates; and said optical path changing slopes of said optical path control layer comprise concave or convex portions each shaped like a triangle or quadrangle in cross section, said triangle or quadrangle containing two optical path changing slopes facing said light sources, respectively.

37. A liquid-crystal display device according to claim 28, wherein each of said light sources is surrounded by a light-reflective light source holder and disposed and held on a side surface of said visual side or back side substrate in a manner in which end portions of upper and lower surfaces of said visual side or back side substrate are bonded to end portions of said light source holder.

38. A liquid-crystal display device according to claim 28, wherein a liquid-crystal drive circuit is formed between said low-refractive-index transparent layer and said semi-transmission reflection layer in said back side substrate.

* * * * *

UNITED STATES PATENT AND TRADEMARK OFFICE
CERTIFICATE OF CORRECTION

PATENT NO. : 7,030,945 B2
APPLICATION NO. : 10/225532
DATED : April 18, 2006
INVENTOR(S) : Seiji Umemoto et al.

Page 1 of 1

It is certified that error appears in the above-identified patent and that said Letters Patent is hereby corrected as shown below:

Column 33:

line 39, delete "part of light", and insert therefor --part of a light--.

Column 34:

line 40, delete "light sources", and insert therefor --light source--;

line 43, delete "control layers", and insert therefor --control layer--;

line 62, delete "two side surfaces", and insert therefor --side surfaces--.

Column 35:

line 6, delete "control layers", and insert therefor --control layer--.

Signed and Sealed this

Twenty-second Day of August, 2006

JON W. DUDAS
*Director of the United States Patent and Trademark Office*